US008026945B2

(12) United States Patent
Garoutte et al.

(10) Patent No.: US 8,026,945 B2
(45) Date of Patent: Sep. 27, 2011

(54) DIRECTED ATTENTION DIGITAL VIDEO RECORDATION

(75) Inventors: Maurice V. Garoutte, Dittmer, MO (US); Fengtang Wang, Ballwin, MO (US); Michael T. Fitzgerald, Waterloo, IL (US)

(73) Assignee: Cernium Corporation, Reston, VA (US)

( * ) Notice: Subject to any disclaimer, the term of this patent is extended or adjusted under 35 U.S.C. 154(b) by 582 days.

(21) Appl. No.: 11/491,485

(22) Filed: Jul. 24, 2006

(65) Prior Publication Data
US 2007/0035623 A1 Feb. 15, 2007

Related U.S. Application Data

(60) Provisional application No. 60/701,804, filed on Jul. 22, 2005.

(51) Int. Cl.
*H04N 9/47* (2006.01)
*H04N 5/228* (2006.01)
(52) U.S. Cl. .................... 348/143; 348/208.1
(58) Field of Classification Search .............. 348/65–67, 348/143, 169, 208.1, 372–376
See application file for complete search history.

(56) References Cited

U.S. PATENT DOCUMENTS

| 5,434,617 | A | 7/1995 | Bianchi |
| 5,455,561 | A | 10/1995 | Brown |
| 5,579,471 | A | 11/1996 | Barber et al. |
| 5,592,567 | A | 1/1997 | Kilger |
| 5,602,585 | A | 2/1997 | Dickinson et al. |
| 5,689,442 | A | 11/1997 | Swanson et al. |
| 5,706,367 | A | 1/1998 | Kondo |
| 5,724,475 | A | 3/1998 | Kirsten |
| 5,729,295 | A | 3/1998 | Okada |
| 5,745,166 | A | 4/1998 | Rhodes et al. |
| 5,761,326 | A | 6/1998 | Brady et al. |
| 5,809,200 | A | 9/1998 | Nishimoto et al. |

(Continued)

FOREIGN PATENT DOCUMENTS

EP 0 482 427 A2 4/1992
(Continued)

OTHER PUBLICATIONS

International Search Report and Written Opinion for International Application No. PCT/US06/28843, dated Sep. 25, 2007, (12 pages).

(Continued)

*Primary Examiner* — Lin Ye
*Assistant Examiner* — Trung Diep

(57) ABSTRACT

The present invention describes systems and methods of incorporating detailed snapshots of targeted areas of interest into a video or digitized recording of the overall scene including metadata to link the snapshots to the time and location in the overall scene from which the snapshot was acquired. A single fixed high-resolution scene camera or a fixed standard resolution scene camera of analog or IP connected type is used, co-located with at least one pan-tilt-zoom (PTZ) camera or by using the same scene camera in a mode where less than full resolution of the scene camera is used for video but snapshots of areas are captured by the same camera where higher resolution thereof is used for snapshots than for video. The area of interest is selected by the object-tracking feature of an intelligent video system, operated without human intervention, by electronically-implemented identification of the existence of area-specific subjects or targets of interest in the scene image field.

31 Claims, 17 Drawing Sheets

U.S. PATENT DOCUMENTS

| | | | |
|---|---|---|---|
| 5,825,413 A | 10/1998 | Mullis | |
| 5,886,743 A | 3/1999 | Oh et al. | |
| 5,923,364 A | 7/1999 | Rhodes et al. | |
| 5,953,488 A | 9/1999 | Seto | |
| 5,959,672 A | 9/1999 | Sasaki | |
| 5,982,418 A | 11/1999 | Ely | |
| 6,031,573 A | 2/2000 | MacCormack et al. | |
| 6,043,847 A | 3/2000 | Kadono et al. | |
| 6,069,655 A | 5/2000 | Seeley et al. | |
| 6,075,559 A | 6/2000 | Harada | |
| 6,097,429 A * | 8/2000 | Seeley et al. | 348/154 |
| 6,122,411 A | 9/2000 | Shen et al. | |
| 6,148,030 A | 11/2000 | Katata et al. | |
| 6,148,140 A | 11/2000 | Okada et al. | |
| 6,151,413 A | 11/2000 | Jang | |
| 6,166,763 A | 12/2000 | Rhodes et al. | |
| 6,182,069 B1 | 1/2001 | Niblack et al. | |
| 6,233,356 B1 | 5/2001 | Haskell et al. | |
| 6,301,386 B1 | 10/2001 | Zhu et al. | |
| 6,307,885 B1 | 10/2001 | Moon et al. | |
| 6,330,025 B1 | 12/2001 | Arazi et al. | |
| 6,437,819 B1 | 8/2002 | Loveland | |
| 6,469,737 B1 * | 10/2002 | Igarashi et al. | 348/211.3 |
| 6,493,022 B1 | 12/2002 | Ho et al. | |
| 6,504,479 B1 * | 1/2003 | Lemons et al. | 340/541 |
| 6,512,793 B1 | 1/2003 | Maeda | |
| 6,542,621 B1 | 4/2003 | Brill et al. | |
| 6,546,120 B1 | 4/2003 | Etoh et al. | |
| 6,560,366 B1 | 5/2003 | Wilkins | |
| 6,573,907 B1 | 6/2003 | Madrane | |
| 6,591,006 B1 | 7/2003 | Niemann | |
| 6,628,323 B1 | 9/2003 | Wegmann | |
| 6,628,887 B1 | 9/2003 | Rhodes et al. | |
| 6,680,745 B2 * | 1/2004 | Center et al. | 348/14.16 |
| 6,707,486 B1 | 3/2004 | Millet et al. | |
| 6,724,421 B1 * | 4/2004 | Glatt | 348/154 |
| 6,771,306 B2 | 8/2004 | Trajkovic et al. | |
| 6,798,977 B2 | 9/2004 | Maeda | |
| 6,826,228 B1 | 11/2004 | Hui | |
| 6,879,705 B1 | 4/2005 | Tao et al. | |
| 7,020,335 B1 | 3/2006 | Abousleman | |
| 7,292,264 B2 * | 11/2007 | Itokawa | 348/143 |
| 7,423,669 B2 * | 9/2008 | Oya et al. | 348/208.14 |
| 7,428,000 B2 | 9/2008 | Cutler et al. | |
| 7,447,337 B2 | 11/2008 | Zhang et al. | |
| 7,469,139 B2 * | 12/2008 | van de Groenendaal | 455/411 |
| 7,525,570 B2 * | 4/2009 | Kiely et al. | 348/143 |
| 2001/0005208 A1 | 6/2001 | Minami et al. | |
| 2001/0043270 A1 | 11/2001 | Lourie et al. | |
| 2001/0046262 A1 | 11/2001 | Freda | |
| 2002/0009141 A1 | 1/2002 | Yamaguchi et al. | |
| 2002/0030741 A1 | 3/2002 | Broemmelsiek | |
| 2002/0140814 A1 | 10/2002 | Cohen-Solal et al. | |
| 2003/0071891 A1 | 3/2003 | Geng | |
| 2003/0081504 A1 | 5/2003 | McCaskill | |
| 2003/0125109 A1 | 7/2003 | Green | |
| 2003/0147462 A1 | 8/2003 | Maeda | |
| 2004/0017386 A1 | 1/2004 | Liu et al. | |
| 2004/0064838 A1 | 4/2004 | Olesen et al. | |
| 2004/0075738 A1 | 4/2004 | Burke et al. | |
| 2004/0100563 A1 | 5/2004 | Sablak et al. | |
| 2004/0119819 A1 | 6/2004 | Aggarwal et al. | |
| 2004/0125207 A1 | 7/2004 | Mittal et al. | |
| 2004/0143602 A1 | 7/2004 | Ruiz et al. | |
| 2004/0169587 A1 | 9/2004 | Washington | |
| 2004/0186813 A1 | 9/2004 | Tedesco et al. | |
| 2004/0239776 A1 * | 12/2004 | Shinohara et al. | 348/239 |
| 2004/0244047 A1 * | 12/2004 | Shinkai et al. | 725/115 |
| 2004/0246336 A1 * | 12/2004 | Kelly et al. | 348/143 |
| 2004/0263476 A1 * | 12/2004 | Lim et al. | 345/157 |
| 2004/0263636 A1 * | 12/2004 | Cutler et al. | 348/211.12 |
| 2005/0007479 A1 | 1/2005 | Ahiska | |
| 2005/0012817 A1 | 1/2005 | Hampapur et al. | |
| 2005/0036036 A1 | 2/2005 | Stevenson et al. | |
| 2005/0086704 A1 | 4/2005 | Rhodes et al. | |
| 2005/0134450 A1 | 6/2005 | Kovach | |
| 2005/0185823 A1 | 8/2005 | Brown et al. | |
| 2006/0136972 A1 * | 6/2006 | Metzger et al. | 725/105 |
| 2006/0159308 A1 * | 7/2006 | Hampapur et al. | 382/103 |
| 2006/0165386 A1 | 7/2006 | Garoutte | |
| 2006/0167595 A1 | 7/2006 | Breed et al. | |
| 2006/0195569 A1 | 8/2006 | Barker | |
| 2007/0094716 A1 | 4/2007 | Farino | |
| 2007/0237235 A1 | 10/2007 | Krishnan | |
| 2008/0279279 A1 | 11/2008 | Liu et al. | |
| 2010/0124274 A1 | 5/2010 | Cheok et al. | |

FOREIGN PATENT DOCUMENTS

| | | |
|---|---|---|
| WO | WO 96/31047 | 10/1996 |

OTHER PUBLICATIONS

International Search Report and Written Opinion from International Application No. PCT/US2008/070134, 8 pgs.

U.S. Office Action mailed Jul. 17, 2006, for U.S. Appl. No. 10/041,402, filed Jan. 8, 2002.

U.S. Office Action mailed Aug. 14, 2006, for U.S. Appl. No. 11/388,505, filed Mar. 24, 2006.

U.S. Office Action mailed Feb. 23, 2007, for U.S. Appl. No. 10/041,402, filed Jan. 8, 2002.

U.S. Office Action mailed Jul. 18, 2007, for U.S. Appl. No. 10/041,402, filed Jan. 8, 2002.

U.S. Office Action mailed Sep. 12, 2007, for U.S. Appl. No. 11/388,505, filed Mar. 24, 2006.

U.S. Office Action mailed Jan. 2, 2008, for U.S. Appl. No. 10/041,402, filed Jan. 8, 2002.

U.S. Office Action mailed Sep. 12, 2008, for U.S. Appl. No. 10/041,402, filed Jan. 8, 2002.

U.S. Office Action mailed Mar. 18, 2009, for U.S. Appl. No. 10/041,402, filed Jan. 8, 2002.

Pending U.S. Appl. No. 10/041,402, filed Jan. 8, 2002.

International Search Report from International Application No. PCT/US2003/00475, mailed Apr. 29, 2003, 5 pgs.

International Search Report and Written Opinion from International Application No. PCT/US2007/07183, mailed Feb. 8, 2008, 7 pgs.

International Search Report and Written Opinion from International Application No. PCT/US2009/64759, mailed Feb. 4, 2010, 9 pgs.

Wang et al., "A Video Analysis Framework for Soft Biometry Security Surveillance," International Multimedia Conference, Proceedings of the third ACM International Workshop on Video Surveillance and Sensor Networks 2005, Hilton Singapore, Nov. 11, 2005 [Retrieved Jan. 27, 2010] Retrieved from the Internet. <URL: http://excelsior.cs.ucsb.edu/papers/vssn05.pdf> entire document ,especially: p. 71, Abstract: p. 73, col. 2, para 4; p. 75, col. 1, para 2 and col. 2, para 2-4; p. 76, col., para 1 and col. 2, para 2; p. 77, Fig. 4; p. 78, Figs. 5-7.

L. Gibson, et al., "Vectorization of raster images using hierarchical methods", Computer Graphics and Image Processing vol. 20, No. 1, Sep. 1982, pp. 82-89.

Cordelia Schmid, Weakly Supervised Learning of Visual Models and Its Application to Content-Based Retrieval International Journal of Computer Vision, Kluwer Academic Publishers, Bo, vol. 56,No. 1-2, Jan. 1, 2004, pp. 7-16.

European Search Report dated Mar. 18, 2010 for European Application No. EP 06 78 5424.

* cited by examiner

115

300

815

Formula for Angle of View, from many places
$\theta = 2 * \text{ArcTan}(F/(2*f))$ Where, from the figure above:
$\theta$ = Angle of View
F = Frame Size in the direction of the angle
f = Focal length of the lens

DIRECTED ATTENTION DIGITAL VIDEO RECORDATION

CROSS-REFERENCE TO RELATED APPLICATIONS

The present application claims the benefit of U.S. Provisional Patent Application No. 60/701,804, filed on Jul. 22, 2005, entitled, "Directed Attention Digital Video Recordation with Software Scope" by Garoutte et al., which is incorporated herein by reference in its entirety.

The following patent applications of common assignee are herein incorporated by reference in their entireties:

"System for Automated Screening of Security Cameras", U.S. patent application Ser. No. 09/773,475, filed Feb. 1, 2001, which resulted in granted U.S. Pat. No. 6,940,998 B2, issued on Sep. 6, 2005.

"Object Selective Video Recording", U.S. patent application Ser. No. 10/041,402, filed Jan. 8, 2002.

BACKGROUND OF THE INVENTION

1. Field of the Invention

The invention relates to capture and recording of images for analysis, storage and other purposes, and more particularly to directed image video capture and digital video recordation.

2. Background Art

Directed image video capture is a useful technology for identification of subjects which are targets of interest in captured images. Targeted image capture and analysis are particularly important for forensic, security or information storage purposes.

The term "video" is herein used in its broad sense. Thus, video relates to electronically-captured picture information, as in a television system or monitor system, and may use equipment for the reception, recording or playback of a television or television-like picture. A video system may provide large-capacity video storage for on-demand retrieval, transmission, and other uses, and generally capable of storage in digital media, such as disk drives, or memory arrays. The term video thus emphasizes visual rather than audio aspects of the television or television-like medium. It may involve an animated series of images or sequential series of still images, not necessarily animated. Video relates in any event to the technology of capturing and processing electronic signals representing pictures, by which a series of framed images are put together, one after another, whether smoothly or not, such as to show interactivity and/or motion or the presence of absence of objects, persons or areas of interest in an image field. Video can be captured as individual or sequential frames, and by digital technologies or by analog schemes such as, without limiting the generality of the foregoing, by the use of well-known NTSC protocol involving interlaced frames. Thus, the present inventor in employing the term video refers in a general sense to any method or technology using video, video devices, video or electronic cameras, or television technology to produce an image. Video may involve slow-scanning or high-speed scanning of frames, and wherein images are typically captured by CCD (charge coupled device) sensors. The present invention relates to capturing, analyzing and storing of images using video techniques, and relates most generally to visual information in an integrated system, such as a security system employing one or more video cameras, including cameras that capture images by electronic analog or digital means, whether continuously or intermittently, and including those using techniques involving digitization of images whether captured by either analog or digital electronic sensors.

The present invention, which takes an approach different from the known art, is particularly useful as an improvement of the system and methodology disclosed in a granted patent application owned by the present applicant's assignee/intended assignee, entitled, "System for Automated Screening of Security Cameras" (U.S. Pat. No. 6,940,998, issued Sep. 6, 2005), and herein incorporated by reference. The system disclosed in U.S. Pat. No. 6,940,998 is hereinafter referred to as the PERCEPTRAK system. The term PERCEPTRAK is a registered trademark (Regis. No. 2,863,225) of Cernium, Inc., applicant's assignee/intended assignee, to identify video surveillance security systems, comprised of computers; video processing equipment, namely a series of video cameras, a computer, and computer operating software; computer monitors and a centralized command center, comprised of a monitor, computer and a control panel.

The present invention also takes advantage of, and is particularly useful as an improvement of, the system and methodology disclosed in a copending allowed patent application owned by the present inventor's assignee/intended assignee, namely U.S. application Ser. No. 10/041,402, filed Jan. 8, 2002, entitled, "Object Selective Video Recording", and hereinafter referred to as the OSR patent, and herein incorporated by reference. The system disclosed in the OSR patent is referred to as the OSR system. The OSR system is an object selective video analysis and recordation system in which one or more video cameras provide video output to be recorded in a useful form on recording media with reduction of the amount of the recording media, with preservation of intelligence content of the output. Spatial resolution and temporal resolution of objects in the scene are automatically varied in accordance with preset criteria based on predetermined interest in the object attributes while recording the background video and object video. A user of the OSR system may query recorded video images by specified symbolic content, enabling recall of recorded data according to such content. The term OSR a trademark of Cernium, Inc., applicant's assignee/intended assignee, to identify an object selective video analysis and recordation system, namely as comprised of computers; provision for receiving the video output of video cameras, one or more computers, and computer operating software, computer monitors and a centralized command center in which one or more such video cameras provide output video to be recorded in a useful form on recording media with reduction of the amount of the recording media, yet with preservation of the content of such images.

OSR is a distributed recording system that does not require a command center as used in the Perceptrak system. The OSR command center may be comprised of a monitor, computer and a control panel) in which one or more video cameras provide output video to be recorded in a useful form on recording media with reduction of the amount of the recording media, yet with preservation of the content of such images.

There are various methods of video data analysis. An example method of real-time video analysis of video data is performed in the Perceptrak system. During the analysis, a single pass of a video frame produces a terrain map which contains elements termed primitives which are low level features of the video. Based on the primitives of the terrain map, the system is able to make decisions about which camera an operator should view based on the presence and activity of vehicles and pedestrians and furthermore, discriminates vehicle traffic from pedestrian traffic. The Perceptrak system was implemented to enable automatic decisions to be made about which camera view should be displayed on a display monitor of the CCTV system, and thus watched by supervisory personnel, and which video camera views are ignored, all based on processor-implemented interpretation of the content of the video available from each of at least a group of video cameras within the CCTV system.

The Perceptrak system uses video analysis techniques which allow the system to make decisions automatically about which camera an operator should view based on the presence and activity of vehicles and pedestrians.

An existing implementation of the above-identified Perceptrak system relies on a fixed camera to maintain an adaptive background. The camera must stay fixed in order to segment targets by comparison with the background. Targets can be segmented, and tracked, as small as 10 pixels high by ten wide. On a high-resolution analysis, that is 100/(640*480) or 0.03 percent of the scene. With low resolution it is still 0.03 percent of the scene. However, with so few pixels on the target we can only record the path of the object. More pixels are required on the target for proper identification.

All existing recording systems have the same limitation of the number of pixels on the target required for forensic recognition. A recently widely reported crime was the reported kidnapping and killing of victim Carlie Jane Brucia. Even where the subjects are near the camera, as was the during in the abduction of Ms. Brucia, where a digital camera captured what was considered a good image, persons in the captured image could not be positively recognized from the image.

FIG. 1 is a reproduction of what is believed to be a true image 100 captured during that abduction.

The original image 100 of the abduction in FIG. 1 is 250 pixels wide by 140 high. It shows the abductor 110 and the victim 105 walking on a light-colored pavement 120. The area of the abductor's face 115 in FIG. 1 has only 195 pixels (13×15).

FIG. 2 is a reproduction of what is believed to be a true image 115 of the face of the abductor captured during that abduction.

Even digitally enlarged as in FIG. 2, the face of the abductor cannot be recognized. The victim's abduction took place so close to the camera that the abductor's face occupied one half of one percent of the scene, and even so, the image could not be used for positive recognition.

A "mug shot" 300 of the alleged abductor, reported to be one Joseph Smith, is seen in FIG. 3, and is 115,710 pixels in size even after cropping to just the area of the face. This number of pixels is almost half of a 640×480 image. It is simply not possible to have enough 640×480 cameras monitoring any real scene to obtain an image of the forensic value as FIG. 3.

Using fixed cameras, the only way to get more pixels on a target is to use more cameras or cameras with more pixels. The next generation of cameras could have HDTV (high definition television) resolution having 1,080 scan lines×1,920 pixels/line=2,073,600 pixels. If the camera at the car wash where FIG. 1 was captured had HDTV resolution, the face of the abductor would still have occupied only one half of one percent of the scene.

However, using a two megapixel sensor for video capture, that one half of one percent of scene would be 10,368 pixels.

FIG. 4 is the same "mug shot" image as image 300 in FIG. 3, but digitally reduced to an image 400 containing 10,179 pixels. It is noticeably less detailed than the 115,710 pixels of FIG. 3. The image in FIG. 4 is useful for forensic purposes. If the car wash camera where the video of the scene was taken were HDTV resolution, that image might have been usable to identify the abductor.

Yet, even a HDTV resolution camera cannot get enough pixels, for forensic purposes, of a person beyond the near field of FIG. 1.

FIG. 5 illustrates the difficulty. FIG. 5 is a crude depiction 500 of the abduction moved back by image-handling technique to the corner of the light colored pavement 120. At that location, when scaled to the pavement stripes, the people 110 and 105 in the scene are 40% as high due to the wide-angle lens used. At 40% of the height, the face of the abductor would have 0.4*0.4*10,368 pixels, that is, 1660 pixels.

FIG. 6 is the abductor's "mug shot" digitally reduced to an image 600 containing 1764 pixels. The image 600 of FIG. 6 is approaching the limits of usefulness of a HDTV resolution camera. For the car wash where Ms. Brucia was abducted, the camera could only have covered the area of the light colored pavement.

While the camera in FIG. 1 covered a visual sector on only one side of a car wash, it is normal to have even longer views on surveillance cameras covering even larger areas. It should be evident that, if a HDTV resolution camera could not even cover all of one side of a car wash with forensic quality images, then a larger parking lot would require a different conceptual design of even greater capacity.

FIG. 7 is a wide view image of a scene 700 in a parking lot. The crosshairs 750 at the near end of the parking lot mark the center of the image that is 240 feet from the camera. The far end of the parking lot is 380 feet from the camera.

FIG. 8 is a zoom or area enlargement to the far end of that parking lot, providing an image of a person 810 standing 380 feet from the camera in the same scene 700 as FIG. 7 but with the camera zoomed in to 160 mm. Crosshairs 850 point to the center of the image. FIG. 8 has 307,200 (640×480) pixels on area 800 that has only 16×12 pixels (192 pixels) in FIG. 7 amounting to 0.0625 percent of the area shown in FIG. 7.

That degree of zoom or enlargement provides 1600 [calculated as 307200/192] times as many pixels on a target as in FIG. 7.

FIG. 9 is a digital enlargement of an area 815 shown in FIG. 8, 69 pixels wide, of the face of the person 810. In FIG. 8, the face is 69 pixels wide by 89 pixels high (6141 pixels). To get the same 6141 pixels on the face with the zoom factor of FIG. 7 would require 1600 times as many pixels in a frame, being (1600*640*480) or 491,000,000 pixels. For a 24-bit color image that would amount to 1.47 gigabytes per frame. Recording 30 FPS at that resolution and uncompressed would require one terabyte of storage every 22.6 seconds. Or, with 1000:1 compression, one terabyte would store 6.29 hours of video. Clearly, a brute force higher resolution sensor will overwhelm current storage devices.

Digital Video Recorders (DVRs) currently in use have no "knowledge" of the content of the video that is being recording. The current state-of-the-art is the use of motion detection to enable recording so that storage space (usually disk drives) is not wasted when there is no motion in the camera scene. Motion detection saves storage space in a quiet scene but, when recording, still requires recording use of most of the storage recording background information. This is because without knowledge of the content of the scene, to record the part of the scene that is of interest, a DVR must be used to record the entire scene.

FIG. 10 is a video image 1010 that was taken during the well-known abduction of Ms. Brucia. Note that the DVR used the same resolution for the cracks in the pavement shown in the area 1030, as for the faces of the abductor and his victim.

Detail of the cracks is enlarged in image 1035. Abductor's face enclosed in the area 115 is enlarged in image 1025. Such serves to emphasize that DVR recordation of an entire scene captured by a camera view necessarily will record very much useless information such as pixel content of such relatively useless image content as extraneous image content as pavement cracks and other insignificant background features.

For efficient recordation by DVR of only those portions of video or other digital image content in such scenes as this as will serve useful forensic purposes, such as aiding in identification of targets (subjects) of interest, it is desired to store images such portions of the scene ("areas of interest" or "regions of interest") as will contain a target of interest, and at sufficient pixel resolution as will be useful for such purposes.

It has been proposed, as in the OSR system discussed hereinbelow, to provide object selective video analysis and recordation system in which one or more video cameras provide output video to be recorded in a useful form on recording media with reduction of the amount of the recording media, yet with preservation of the content of such images. Thus, background scenes can be recorded only periodically or at least less frequently, and at a lower pixel resolution, as will enable great savings of digital recording media, but to allow recordation of targets of interest more frequently and at higher resolution.

It would be desirable to provide a capability of combining recordation of images of overall or background scenes with recordation of a still higher resolution snapshot (still image) of an area of interest which includes a target of interest which has been electronically detected to exist within the overall or background scene. It would also be desirable to record with such images data to link the snapshots to the time and location in the overall scene from which the snapshot was acquired.

Existing State of the Art

The emerging field of intelligent video systems has enabled the long-sought feature of an "Automatic Tracking Camera." For example, the Perceptrak system available from Cernium Inc. includes this feature. Prior to the creation of intelligent video systems with object tracking, all PTZ cameras either were on preset tours or manually controlled by operators. In addition, technology is known that is said to monitor an area with a preset tour; once motion is detected, using a camera that automatically locks onto a subject, but image lock-on schemes are not here relevant.

Among commercially offered or available products, there is indication of need to automatically control pan-tilt-zoom (PTZ) cameras. Even so, such known or proposed products demonstrate that the data gathered by such automatic PTZ control of video cameras is still considered by the industry to consist of a video stream. Such commercial products claim to produce video by tracking motion. Yet, none combines the recording of a video camera with images from an automatically controlled PTZ camera and links the location of the acquired images with a fixed camera view.

So also, among U.S. patents, the following patents relate to the field of automatically controlled PTZ cameras: U.S. Pat. Nos. 6,771,306 (Trajkovic et al.); 6,628,887 (Rhodes et al.); 6,437,819 (Loveland); and 5,434,617 (Bianchi). Each such reference discloses treatment of the data from the tracking camera as video and each such reference does not address linking the acquired images from the tracking camera to the overall view of a fixed camera.

So far as has been determined, the state of the art is that available automated video tracking systems and proposals for them have employed a tracking camera, such as a PTZ camera, wherein data acquired from the tracking camera is treated as video but the tracking images are not linked to the overall view of a fixed camera.

There remains a continuing need for automatically tracking targets to provide higher resolution of a target of interest.

BRIEF SUMMARY OF THE INVENTION

Embodiments of the present invention provide systems and methods for incorporating high-resolution snapshots of targets of interest into video recording of an overall scene that includes the targets of interest.

In one aspect, the present invention combines the use of a first camera to capture scene data with a second "attention directed" higher resolution second camera or data capture arrangement capable of capturing higher resolution images (for example by zooming, image area selection or high resolution area capture) of a area of interest such as one having a target of interest.

Such method is preferably used as part of a system in which the first camera is a single fixed high-resolution camera or a fixed standard resolution camera and the second camera is a PTZ camera; and wherein the system makes use of selection of a target or target of interest by intelligent video analysis, such as most preferably the object-tracking feature of the Perceptrak system hereinabove described.

According to another aspect of the invention, the invention provides a system and method of incorporating snapshot images of targets of interest into a video recording of an overall scene by using one of more cameras to capture scene data, whether in analog or digital form, as by using a digitizer, and then providing in response to intelligent video analysis (as by said Perceptrak system technology, available from Cernium, Inc.) to select without human intervention, during selection, an area target of interest within the scene, and thus to provide as a result, zoomed "attention directed" target of interest image data. Both the scene data and target of interest image data (which is at higher resolution) are received by image data receiving means, such that both the scene video data and the snapshot data are in a format suitable for digital recording. There is also provided provisions for digital storage of both the video and snapshot data within a common context. Preferably, the scene and snapshot data are stored with metadata which identifies the time and scene in which the image data are taken, in a common (or commonly accessible) context or format so as to facilitate its later recall and access, such as for security or forensic recognition so as to identify persons or other subjects of interest which have become targets of interest in the scene.

The new methodology allows incorporating detailed snapshots of targets of interest into a video recording of the overall scene provides for the inclusion of metadata to link the snapshots to the time and location in the overall scene from which the snapshot was acquired. An intelligent video system (for example, the Perceptrak system) that employs a primary image analysis technique may rely on an analysis of a terrain map generated from at least a single pass of a video frame, resulting in characteristic information regarding the content of the video, to identify by object tracking in the scene image a subject/target of interest. The present system may operate according to the direction of the intelligent video system, to direct a PTZ camera to take snapshots of one or more areas of interest, such as may include one or more human, animate or inanimate subjects of interest in the scene. In that embodiment, the image analysis technique is used to direct automatically the PTZ camera's attention, that is, its specific aiming and zooming, to the area, target or subject of interest, such that the PTZ camera will capture a snapshot thereof at higher resolution than is characteristic of a scene video. Alternatively, the zooming may be carried out by artificial zooming within a fixed or video camera or may be carried out in external or internal software implementation by commanding a digitizer or frame assembler to provide a zoomed image (snapshot) of the area of interest (including possibly a subject of interest) by causing only the specific area of interest to be within the snapshot, at the desired greater resolution than the captured scene image.

The snapshot of the targeted area of interest is taken by a PTZ camera or by electronic means such as by digitizer as mentioned above in response to recognition that the area (possibly including a targeted subject of interest) is according to predetermined criteria implemented by system software to be of likely interest, but without requiring any human involvement, i.e., without human intervention during selection, during target, without human intervention, but in accordance with a predetermined protocol carried out by the intelligent selection means, such as according to the Perceptrak system operation.

After thus capturing a snapshot of the area of interest by operation of the PTZ camera, the method provides storage (and ultimately archiving) of the scene image in a file format that includes the snapshot, as well as the metadata. The captured image (snapshot) has substantially much less pixel content than the overall view so that the archived data is greatly minimized.

Aspects of the invention are realized by software, hardware or a combination of hardware and software.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
FIG. 1 is a reproduction of what is believed to be a true image captured during an abduction useful in illustrating the Directed Attention DVR system of the present invention.
Figure 2:
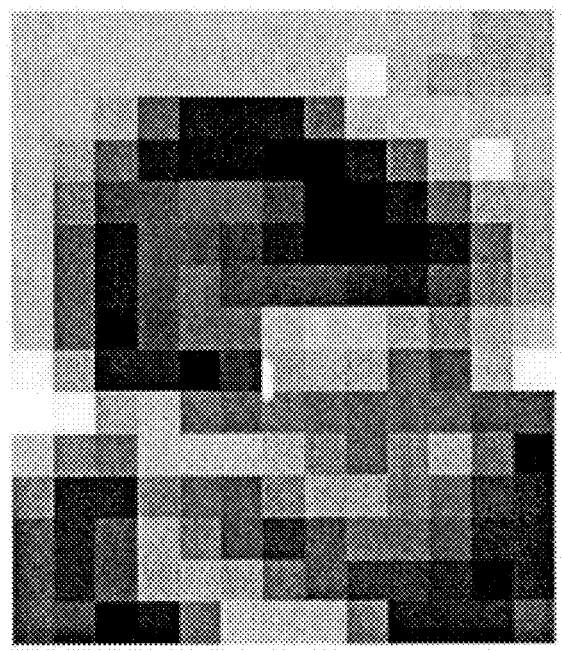
FIG. 2 is a reproduction of what is believed to be a true image of the face of the abductor captured during that abduction, whose identity at the time was not yet known.
Figure 3:
FIG. 3 is a mug shot of the accused abductor.
Figure 4:
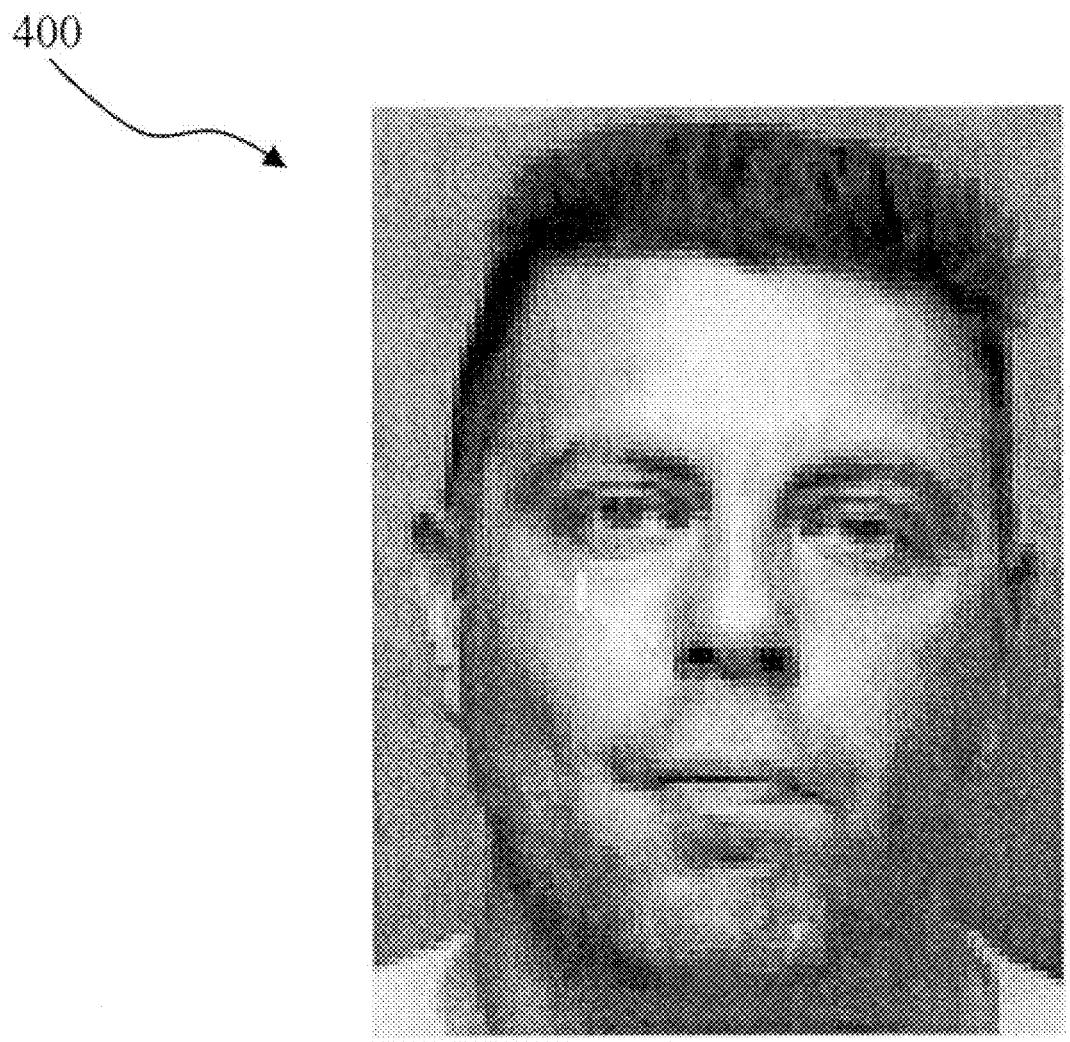
FIG. 4 is a mug shot of the accused abductor using 10K pixels.
Figure 5:
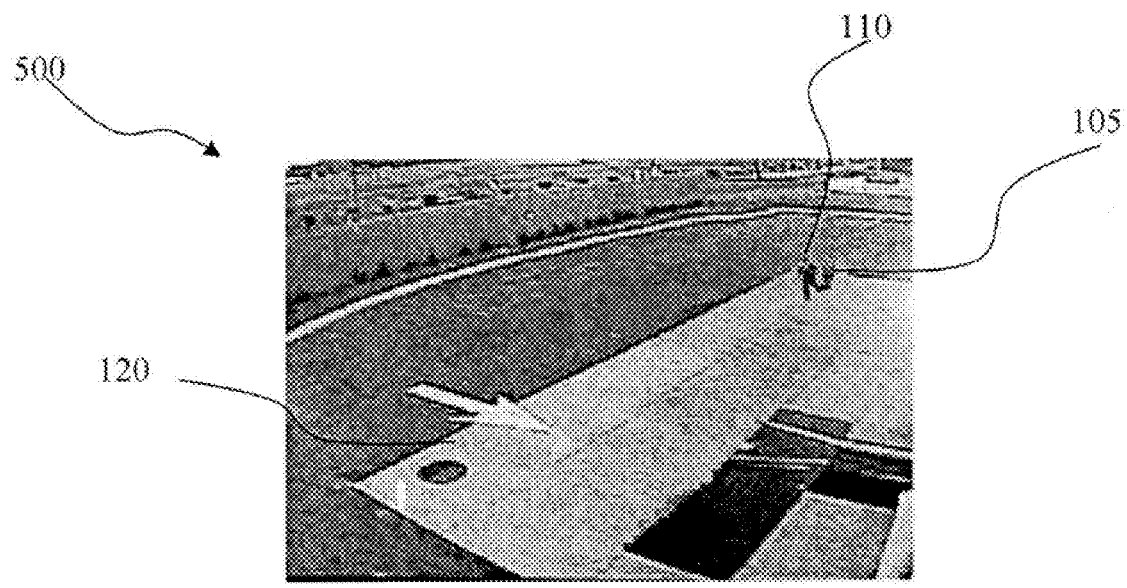
FIG. 5 is a scene image of the abduction where the site of the abduction is moved back in the scene to show the number of pixels of the abductor that can be shown.
Figure 6:
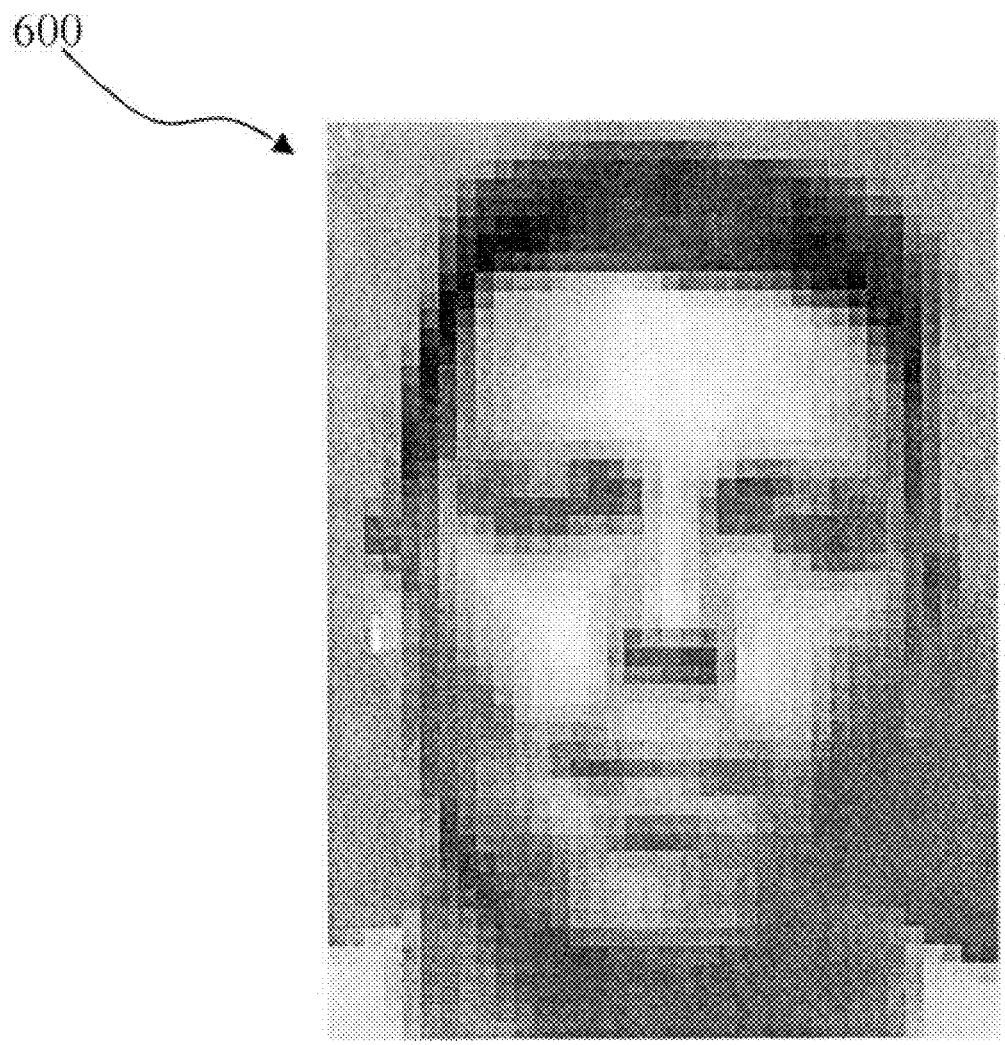
FIG. 6 is the abductor's mug shot digitally reduced to 1764 pixels.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In conventional video recording, the recorder has no understanding of what parts of a video are important. All parts of the scene are treated as equal resulting in the pavement cracks at the feet of an abductor recorded at the same resolution as the abductors face. Without knowledge of what's important, the conventional DVR fills up the storage space with redundant images and is unable to put enough pixels on a target to obtain forensic quality images.

The concepts herein disclosed and referred to most generally here as directed attention DVR concepts, use automatically directed attention to control recording is an extension and improvement of said OSR system, by using intelligent image analysis as according to said Perceptrak system.

As generally set forth in said OSR system, the video output of the system camera(s) represents both background video and object video, being images of objects appearing against a background scene. The OSR system provides computed, preset knowledge of symbolic categories of objects in the scene and analysis of object behavior.

Both spatial resolution and temporal resolution of objects in the scene are automatically varied in accordance with preset criteria based on predetermined interest in the objects and object behavior while recording the background video and object video. The OSR system allows a user of the system to query recorded video images by content, specifically enabling the user to recall recorded data according to its categorical image content, subject characteristics and/or subject behavior.

The OSR system stores (that is archives, so as to allow later recall), the background only occasionally, and uses different compression ratios for different targets. The Directed Attention DVR uses an OSR file to establish the scene, and records only snapshots of targets of interest, as obtained in accordance with the present invention.

The terms save and store are used interchangeably herein, and by storing is meant storing, saving and/or archiving images so that they can be later accessed, such as for the purpose of seeking to identify a subject which has become a target of interest or more fully ascertain features or actions of the subject, possibly in relation to a crime, where a subject of interest may be a perpetrator or a victim or both.

In implementing the present invention, first and second cameras can be used. The first is a scene camera, such as a video camera capable capturing an image scene. The second, according to one type of configuration here disclosed, can be a PTZ camera directed by intelligent processing toward something of interest in the image scene. More specifically, using the intelligent processing of the Perceptrak system, the attention of a PTZ camera is in effect directed by aiming it with zooming at the specific part of a scene, i.e., a target of interest, where there is something of interest to record, namely a target of interest. The first camera can be a high-resolution camera (considered a "fixed camera" for these purposes) or a fixed standard resolution camera which is provided with an overall view of the image scene creates an OSR file that tracks the individual targets of interest and records the targets in the manner set forth in the OSR system. By "target of interest" or "target" or "subject of interest" is meant one or more persons, objects, aspects or features of interest, such as one or more specific vehicles, or specific areas within a scene.

The concept of zooming in to a specific area of interest, such as to target of interest, rather than grabbing (capturing) the entire scene yields a storage improvement proportional to the degree of zoom and so also in circumstances where images must be archived, as in the use of the OSR system.

Figure 7:
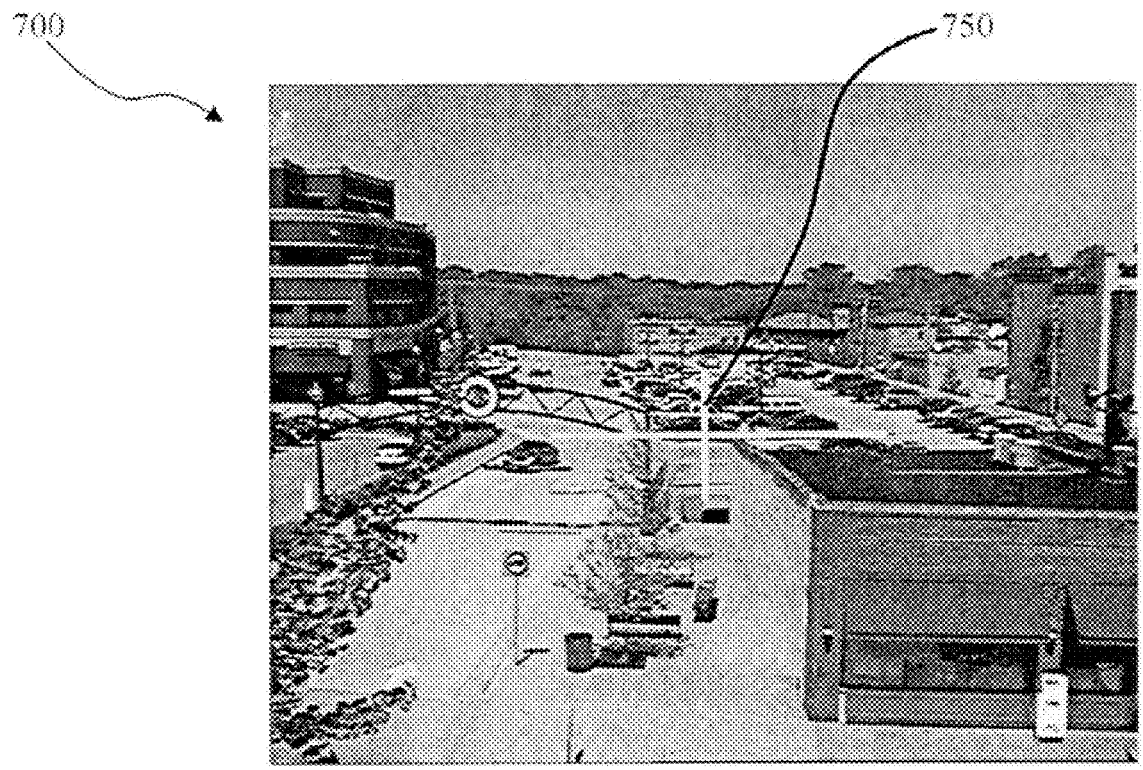
FIG. 7 is a wide view image of a parking lot.
Figure 8:
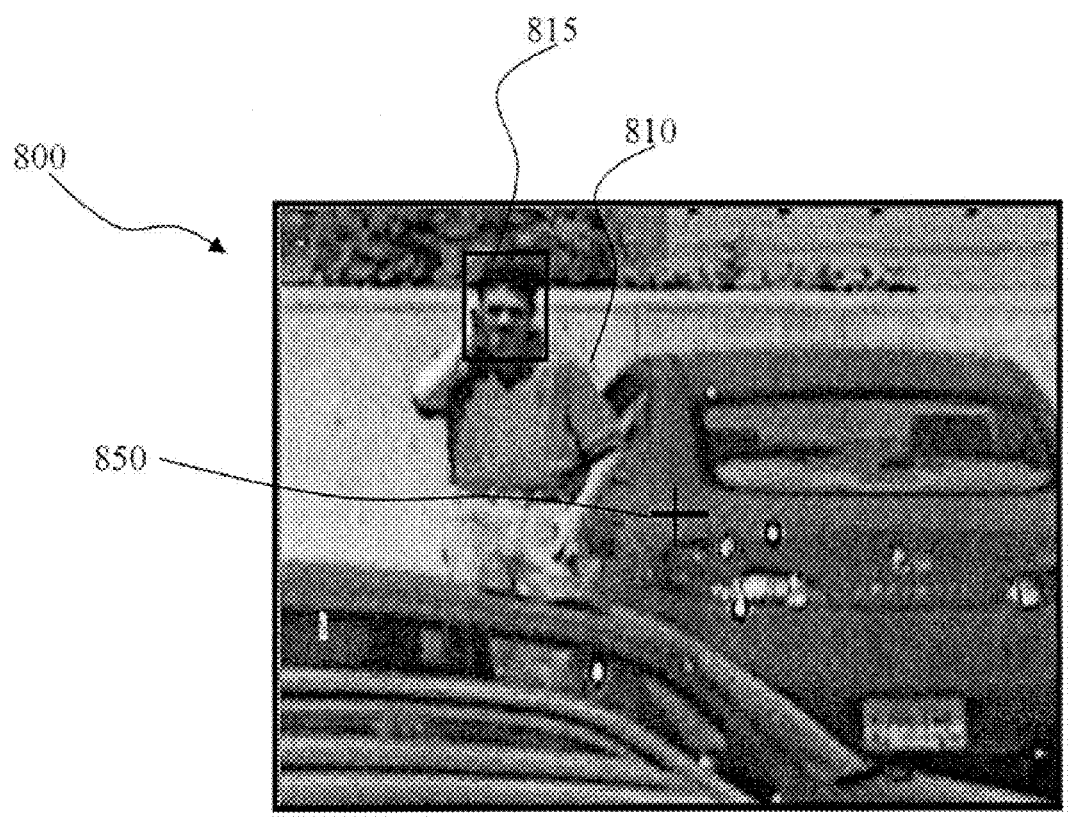
FIG. 8 is a zoom to the far end of that parking lot to show a person standing there.
Figure 9:
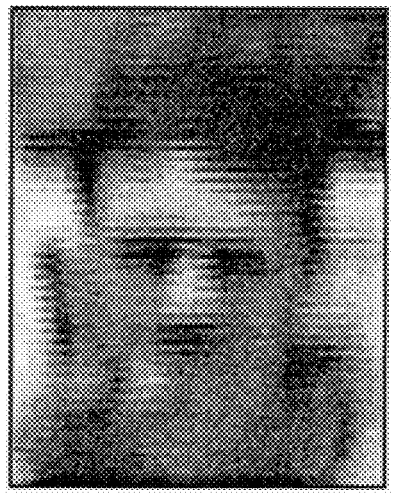
FIG. 9 is cropped part of that person's image, in which his face is 69 pixels in width.
Figure 10:
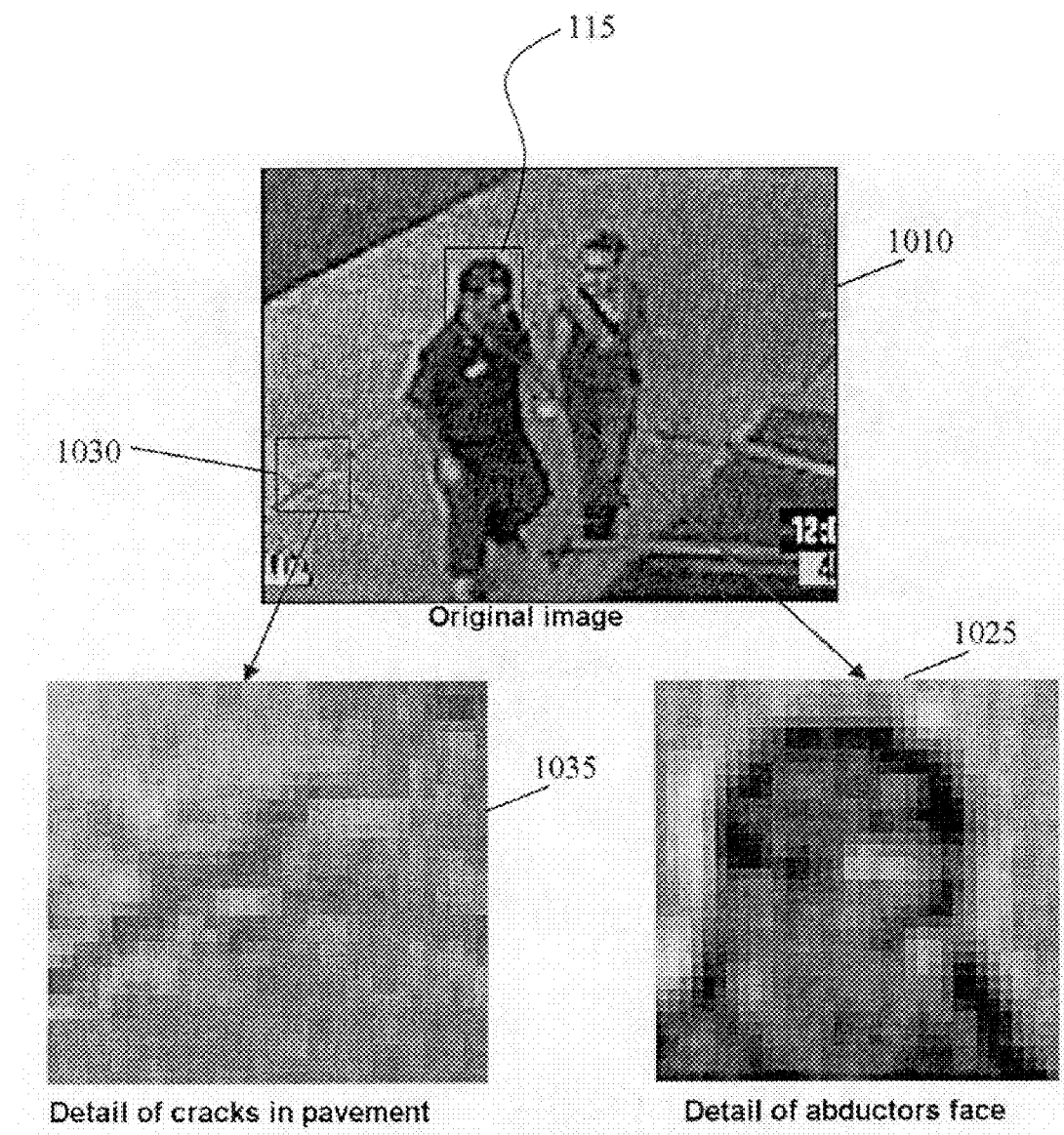
FIG. 10 is a grouping of three image parts from the scene of FIG. 1, in which the three parts are the original abduction scene, a part showing the abductor, and a part showing cracks in pavement of the scene, where all parts are the same in pixel resolution in the original DVR recording.
Figure 11:
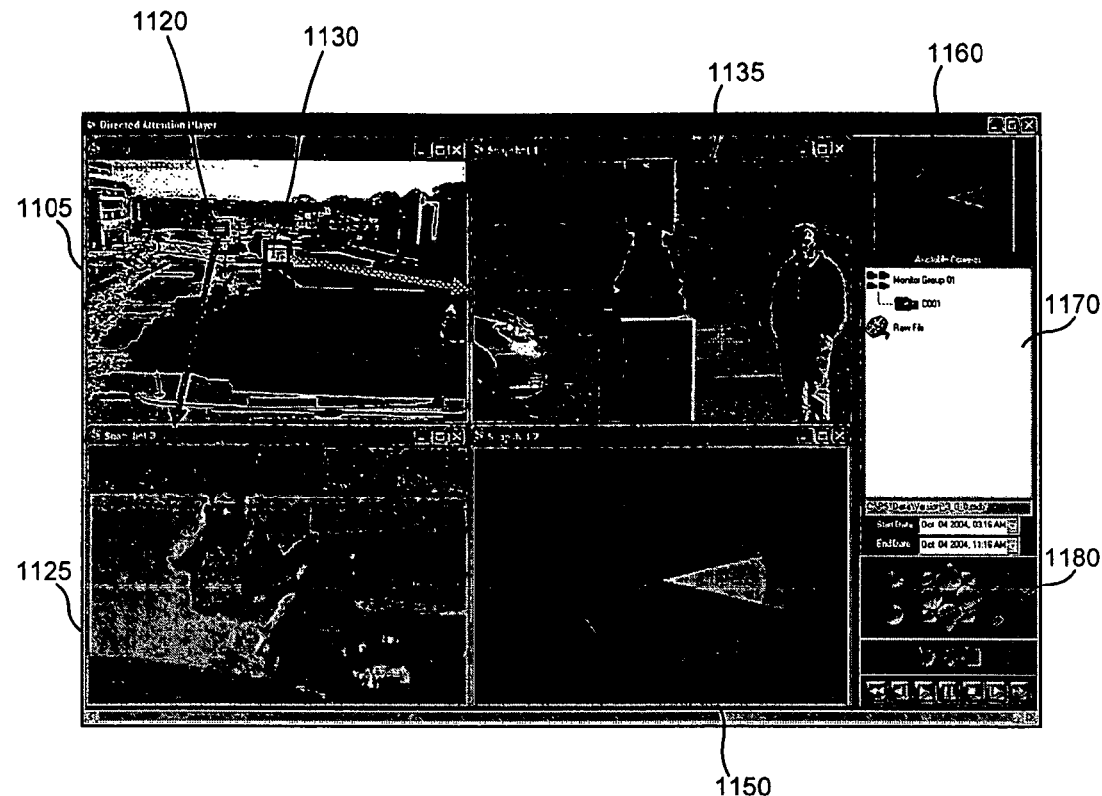
FIG. 11 is a composite screen during playback display during use of the present Directed Attention DVR system of the invention.

Referring to the drawings, the invention may be more readily understood by considering the image content of FIGS. 1, 7 and 8, as previously discussed. FIG. 1 is representative of a scene view in which there in an area of interest having two subjects, one being a kidnapping victim, the other being the alleged kidnapper. FIG. 7 is a wide view image of a parking lot, also seen in FIG. 11 as image 1105. In FIG. 11, the overall scene in the upper left quadrant is the overall scene of the fixed camera. The person in image 1135 displayed in the upper middle quadrant is a zoomed-in view of a person near mid-screen of the fixed camera, enclosed in area 1130. The image 1125 in the lower left quadrant is a zoomed-in view of a person at the far end of the parking lot, enclosed in area 1120. The lower middle quadrant 1150 is shown empty to indicate that no other relevant snapshots are available at the time of the overall view. Other quadrants, such as 1160, 1170, and 1180 may have various information related to the snapshots.

In FIG. 7, as noted to be a wide view image of a parking lot having a distant subject of interest. The crosshairs at the near end of the parking lot mark the center of the image that is 240 feet from the camera. The far end of the parking lot is 380 feet from the camera. By comparison, FIG. 8 is a zoom or area of interest enlargement at the far end of that parking lot, providing an image of a person standing 380 feet from the camera in the same scene as FIG. 7 but with the camera zoomed in to 160 mm. FIG. 8 has been noted as having 307,200 (640×480) pixels on an area that has only 16×12 pixels (192 pixels) in FIG. 7 amounting to 0.0625 percent of the area shown in FIG. 7. That degree of zoom or enlargement provides 1600 [calculated as 307200/192] times as many pixels on a target as in FIG. 7.

In FIG. 1, people in the scene of the abduction occupied 10% of the area of the overall scene for an improvement of 10:1. In FIG. 8, the zoomed-in image occupied 0.0625 percent of FIG. 7, providing a an improvement of 1600:1. Saving (meaning storing, whether for interim purposes or archival purposes) intermittent snapshots, as by use of the OSR system technique, rather than a continuous video stream, yields a storage improvement proportional to the frequency of saving snapshots. Saving one snapshot every 30 seconds instead of a 30 frames per second provides an improvement of 900:1. The two factors are multiplicative; for the examples above the concept of Directed Attention DVR as according to the present invention provides an improvement of between 9000:1 and 1,440,000:1 for the same number of pixels on the target compared to a brute force approach of higher and higher resolution video cameras.

As mentioned above, embodiments of the invention are realized by software, hardware or a combination of hardware and software. Details of various aspects of the invention are discussed below.

OSR System Program Files

Set forth below are descriptions of program files, as fundamentally in accordance with the above-identified OSR system, and as further modified and supplemented in accordance with the present disclosure, as connoted by the term "directed attention."

File Header

The existing FileHeaderType (as follows) remains unchanged.

The FOURCC element will be "OSR2" for directed attention files.

Public Type FileHeaderType
    FOURCC(0 To 3) As Byte '"OSR1" as code for the first iteration of OSR Fourcc code.
    FileId(0 To 11) As Byte 'string such as "Cernium OSR". Was coded resolution.
    FileStart As Date
    FileEnd As Date
    SecSinceMidnight As Single 'Seconds since midnight for file start
    CheckSum As Long 'Per documentation in the source code
    OffsetToQ1Frame As Long 'Offset in file to a frame at the end of the first quarter point
    OffsetToCenterFrame As Long 'Offset in file to a frame at the center of the file
    OffsetToQ3Frame As Long 'Offset in file to a frame at the third quarter point
    OffsetToLastFrame As Long 'Go direct to the last frame in the file
    OsrResolution(0 To 11) As Byte 'Coded string with recording resolution information
    CameraNumber(0 To 7) As Byte 'Camera Number, string whose length is 6 right padding with space
    VersionNum(0 To 7) As Byte 'OSR version number for backwards compatibility
    StorageClassCode As Byte 'Replaces CompressionType-Code as of 04-12-02
End Type
Frame Header
    The Existing FrameHeaderType (as follows) will remain unchanged.
    The NumTargets element will include the number of reference targets and snapshot targets.
Public Type FrameHeaderType
    SecSinceMidnight As Single 'from timer function for this frame
    FrameNumber As Long 'Sequential number start at zero for each file
    EventFlags As Long '32 (16 bit until 04-12-02) bit variable with the 11 lower bits set to indicate active events
    OffsetToBackground As Long 'Offset to the background image header for this frame referenced to start of file
    OffsetToThisImage As Long 'Offset to the first image header for this frame, referenced to start of file
    OffsetToPriorFrame As Long 'Offset to the prior frame header, referenced to start of file or −1 for first frame in file
    OffsetToNextFrame As Long 'Offset to the Next frame header, referenced to start of file, −1 for last frame in file
    NumTargets As Byte 'the number of targets to insert into this Frame
End Type
Image Header
    The existing ImageHeader (as follows) had the TargetIdNumber element added for Version 3.0 and will remain unchanged. The TargetIdNumber is used to relate the snapshot images to other OSR images.
Public Type ImageHeaderType
    OffsetToNextImage As Long 'Offset to the next image header for this frame, referenced to start of file
    ImageROI As RECT 'the top, bottom, left, and right of the image referenced to the background for Targets, or size specification for snapshots.
    TargetIdNumber As Long 'The IdNum of the target or <0 for other than recognized target image
    CheckSum As Long 'a long variable encrypted value to detect changes in the compressed image
    ImageBytes As Long 'the number of bytes in the compressed Image Data
    CompressionTypeCode As Byte 'New as of 04-12-02 to allow different compression for different images in same frame
    QualityLevel As Byte 'New as of 04-12-02 replaces DegreeOfCompression, As used in JPEG 100 is no loss.
    ItsaCode As Byte 'New as of 04-12-02 just like used in AnalysisWorker
    StartMarker As Byte 'Moved to bottom 04-12-02
End Type
Use of StartMarkers
    Two new StartMarkers are added for Directed Attention.
    Public Const BackgroundStartMarker As Byte=66"B'
    Public Const TargetStartMarker As Byte=84"T'
    Public Const SnapshotStartMarker As Byte=83"S'
    Public Const ReferenceStartMarker As Byte=82"R'
New Snapshot Image Type
    Snapshot is a new image type identified with a "S" as a StartMarker in the ImageHeader. A snapshot type image is a grab of a Pan-Tilt-Zoom close-up of an area of the scene being recorded by the OSR file.
    A snapshot image size is not limited or controlled by the record resolution, but will always be the same bits per pixel. The format will allow for low (320×240) resolution recording and high (640×480) resolution snapshots. The snapshot is not required to be a 4×3 aspect ratio. The format leaves open the possibility of getting a snapshot of the aspect ratio of the target to save storage space.
    If the player is not in the snapshot mode then snapshot images can be ignored. They should never be displayed in the same area of the screen as video.
    For snapshot images the ImageROI element of the ImageHeader specifies the size of the snapshot and does not specify the position on the background as in target images.
    If the TargetIdNumber is positive then there is a recognized target in the same frame with that IdNum, The ImageROI of that target will specify the location in the background of the snapshot.
New Reference Image Type
    The conceptual design for the Directed Attention DVR allows occasional grabbing of zoomed in images of the background. It is not necessary to make a detailed recording of the background often, but when there is time available, the system could zoom into the background by rows and columns and maintain a detailed record of the entire scene.
    The high-resolution mosaic of the background along with high-resolution images of individual targets can be related by the ROI information in the Reference ImageHeader.
    Where the StartMarker equals ReferenceStartMarker, the TargetIdNumber will be negative and there will be a ImageHeader with a having the same negative TargetIdNumber immediately following in the OSR file. The ImageROI of the reference image header will specify the location in the background of the snapshot. The Reference image will have zero image bytes, only its ImageROI is of use. The ImageROI of the snapshot image will still be the size of the snapshot.
    Stored high resolution snapshots of the background enable a playback mode where the operator has an overall view of the scene and can use mouse location or up, down, left, and right commands to move a zoomed in view around the background. Pre-processing of one or more OSR files generates an array of offsets in the files to reference frames with ROI information stored. Given that the detailed snapshots exist in the OSR files, and that an index of the snapshot are available, the GUI allows the operator to perform virtual after-the-fact Pan-Tilt-Zoom operations.
Software Structure
OSR File Creation
    OSR files will be created by AnalysisWorker. The only change is the addition of the new image types. Since only AnalysisWorker knows where to take the snapshots, the information must come from the worker.
    But, we do not want the worker to know about video acquisition. The Supervisor module is responsible for video acquisition. When we change the type of camera, we do not want to revise the worker. The Supervisor will still be responsible for acquiring the video but in the case of directed attention snapshots, the video will be acquired according to directions from AnalysisWorker.

The data from the worker to the supervisor will be open ended to handle future video sources. It will include velocity and direction information and timing data to allow timing the snapshot for a moving target.

AnalysisWorker will remain ignorant of any lens dependency. The analysis worker gives data to the supervisor in terms of the grabbing resolution. It is up to the Supervisor to compensate for lens distortion, and to provide PTZ drivers and magnification factors.

Snapshot Selection

Analysis Configuration

The configuration of AnalysisWorker provides a flexible means to allow different cameras to behave over a wide range of operation. The minimum operation will be one shot per target and only if walking toward the camera within a given range. The maximum will keep the PTZ camera occupied full time attempting to snap every target every second.

The AnalysisWorker Configuration includes the following parameters.

| | |
|---|---|
| DO_SNAPSHOTS | A Boolean value, If true then the following parameters will be used. |
| SNAPSHOT_MAX_X | An integer value for the maximum horizontal resolution of the snapshots. (Color depth for snapshot will be same as for record as set by BitsPerPixelRecord.) |
| SNAPSHOT_MAX_Y | An integer value for the maximum vertical resolution of the snapshots. |
| CAMERA_FULL_SLEW_MILS | An integer value for the number of milliseconds required for the camera to slew lower left to upper right. |
| MAX_ZOOM_RATIO | An integer value for the maximum magnification factor of the PTZ camera where 200 means that the PTZ camera will zoom to one half of one percent of the AnalysisWorker scene. |
| SNAP_PEOPLE | A Boolean value, true to take snapshots of people. |
| SNAP_VEHICLES | A Boolean value, true to take snapshots of vehicles. |
| SECS_PER_SHOT_PER_PERSON | An integer value, one or higher for the number of seconds between snapshots per person target. |
| SECS_PER_SHOT_PER_VEHICLE | An integer value, one or higher for the number of seconds between snapshots per vehicle target. |
| FACE_SHOT_RATIO | An integer value, one or higher the ratio of shots restricted to the face. This applies only when a person is moving toward the camera. One means all shots are of the face; two is every other shot is of the face. |
| DROP_CARS_BUSY | A Boolean value, true if cars are to be dropped before people when the scene is too busy to obtain the seconds per target parameters. |
| DROP_PEOPLE_BUSY | A Boolean value, true if people are to be dropped before vehicles when the scene is too busy to obtain the seconds per target parameters. |
| SNAP_ONLY_IN_ACTIVE_MASK | A Boolean value, true to make snapshots only of targets in the active mask. If false, then snap all targets in the scene. |
| CONVERGING_MULTPLIER | An integer value, one or higher for how much to multiply the number of snapshots for people when converging people is detected. One would be no change; two would be twice as many. The limit of one per second still applies. |
| OVERLAP_FACTOR | An integer percentage value, for how much overlap of the target to include in the snapshot. One hundred would use exactly the target ROI. A value of 150 would have 50% higher width and height values than the requested target ROI with the same aspect ratio. |

Supervisor Configuration

The configuration of the Supervisor allows flexible operation with an indefinite number of PTZ cameras. Definitions are:

| | |
|---|---|
| DO_SNAPSHOTS | A Boolean value, If true then the following parameters will be used. |
| NUMBER_PTZ_CAMERAS | An integer value for the number of PTZ cameras controlled by the Supervisor. |
| SNAPSHOT_MAX_X | An integer value for the maximum horizontal resolution of the snapshots. |
| SNAPSHOT_MAX_Y | An integer value for the maximum vertical resolution of the snapshots. |
| SNAPSHOT_COLOR_DEPTH | An integer value for BitsPerPixel to match BitsPerPixelRecord of the AnalysisWorker |
| WORKER_SIZE_X | Horizontal Pixels of Worker view |
| WORKER_SIZE_Y | Vertical Pixels of Worker view |
| WORKER_HOR_DEGREE_VIEW | A floating point for the Horizontal Field of View (FOV) of the Worker |
| WORKER_VER_DEGREE_VIEW | A floating point for the Vertical FOV of the Worker |

Shared Memory for Snapshot

The shared memory block for the snapshots will be named the same as the existing MappedBlockName plus "Snapshot". The first bytes of the shared memory block will contain two SnapshotHeaderType structures to pass information to pass data between the AnlysisWorker and the Supervisor. The first header in the block will be used to tell the supervisor what areas are wanted. The second header in the block will pass back data to the AnalysisWorker on the snapshot that is available for recording. The data of the second header will reflect the request of the AnalysisWorker and include actual ROI and time of the grab, and image ready status.

```
Public Type SnapshotHeaderType
    Handled as Long              Semaphore element.
    SnapshotX as Long            Horizontal size of the snapshot,
                                 pixels
    SnapshotY as Long            Vertical size of the snapshot,
                                 pixels
    TargetIdNumber as Long       IdNum from Analysis
    TargetROI as RECT            From Analysis in Grab Resolution
    WidthsPerSecondX as Long     Recent velocity in widths/sec X
                                 axis
    HeightsPerSecondY as Long    Recent velocity in Heights/Sec Y
                                 axis
    SecsSinceMidnight as Single  Timer when snapshot was
                                 requested/grabbed
End type
```

While the shared memory block is used to exchange data between the processes, the existing Command and ChildRequest methods is used to act as semaphore between the processes to eliminate the need for polling.

The size of the block will be (SNAPSHOT_MAX_X*SNAPSHOT_MAX_Y*BitsPerPixelRecord/8)+ (2*sizeof(SnapshotHeader)).

Fixed Camera Data Structure

To keep track of multiple fixed cameras the Supervisor have an array of UDTs (structures) to consolidate snapshot data about the cameras. As a starting point, the type is defined below.

```
Public type FixedCameraDataType
    FocalLength as single        For angle calculation
    HorImagerSize as single      In same units as Focal Length
    VerImagerSize as single      In same units as Focal Length
    AngleOfView as single        Calc once, use for lead calcs
    MagnificationCorrection as   For fine tuning angle of view
    single
End type
```

PTZ Camera Data Structure

To keep track of multiple PTZ cameras the Supervisor will have an array of UDTs (structures) to consolidate data about the cameras. As a starting point, the type will be as defined below.

```
Public type PTZcameraDataType              For PTZ ClientRegistration
    CameraNumber as String                 For PTZ ClientRegistration
    CamIpAddress As String                 For PTZ ClientRegistration
    SerialAttached As Boolean              For PTZ ClientRegistration
    SerialAddress As Long                  For PTZ ClientRegistration
    PortParms As String                    For PTZ ClientRegistration
    ByVal DriverCode As Long               For PTZ ClientRegistration
    FullSlewMills as Long                  Milliseconds for full slew
    MaxZoomFactor as Long                  As used by Analysis
    MagnificationCorrection as             For fine tuning Mag factor
    single
    '---------- Above here are configuration elements --------------
    --------
    CalculatedPanDegrees as Single         Pan Angle for Current Op
    CalculatedTiltDegrees as Single        Tilt Angle for Current Op
    CalculatedMagFactor as Single          Magnification for Current Op
    PTZserverObj As Object                 To Call PTZ server
    PTZclientNumber as long                From the PTZserver
    RequestedPTZdata as                    From Worker
    SnapshotHeaderType
    SnapshotData as                        Return to the Worker
    SnapshotHeaderType
    SnapshotImagePtr as Long               Pointer to the image data
    CameraBusy as Boolean                  True if PTZ is in progress
End Type
```

An Array of the Structures will be defined as in:
Redim PTZcameraData(0 to NUMBER_PTZ_CAMERAS−1)

Database Revisions

CCTV Cameras Table

New Fields to accommodate PTZ cameras for implementing the present invention are:

```
CamIpAddress As String              For PTZ ClientRegistration
FullSlewMills as Long               Milliseconds for full slew
MaxZoomFactor as Long               As used by Analysis
MagnificationCorrection as single   For fine tuning Mag factor
```

Fields to Accommodate fixed cameras for DADVR:
Public type FixedCameraDataType

```
FocalLength as single               For angle calcs
HorImagerSize as single             In same units as Focal Length
VerImagerSize as single             In same units as Focal Length
AngleOfView as single               Calc once, use for lead calcs
MagnificationCorrection as single   For fine tuning angle of view
SnapshotCamera as Boolean           So Supervisor will know to use it
```

ConfigAnalysis Table

The ConfigAnalysis table schema will be unchanged but the following ParmNames will be added.

```
DoSnapshots          A Boolean value, If true then the
                     following parameters will be used.
SnapshotMaxX         An integer value for the maximum
                     horizontal resolution of the snapshots.
                     (Color depth for snapshot will be same
                     as for record as set by BitsPerPixelRecord.)
SnapshotMaxY         An integer value for the maximum
                     vertical resolution of the snapshots.
CameraFullSlewMils   An integer value for the number of
                     milliseconds required for the camera
                     to slew lower left to upper right.
MaxZoomRatio         An integer value for the maximum
                     magnification factor of the PTZ
                     camera where 200 means that the PTZ
                     camera will zoom to one half of one
                     percent of the AnalysisWorker scene.
SnapPeople           A Boolean value, true to take snap-
                     shots of people.
SnapVehicles         A Boolean value, true to take snap-
                     shots of vehicles.
SecsPerShotPerPerson An integer value, one or higher for
                     the number of seconds between snap-
                     shots per person target.
SecsPerShotPerVehicle An integer value, one or higher for
                     the number of seconds between snap-
                     shots per vehicle target.
FaceShotRatio        An integer value, one or higher the
                     ratio of shots restricted to the face.
                     This applies only when a person is
                     moving toward the camera. One means
                     all shots are of the face; two is every
                     other shot is of the face.
DropCarsBusy         A Boolean value, true if cars are to
                     be dropped before people when the scene
                     is too busy to obtain the seconds per
                     target parameters.
DropPeopleBusy       A Boolean value, true if people are to
                     be dropped before vehicles when the scene
                     is too busy to obtain the seconds per
                     target parameters.
SnapOnlyInActiveMask A Boolean value, true to make snapshots
                     only of targets in the active mask. If
                     false, then snap all targets in the scene.
```

-continued

| ConvergingMuliplier | An integer value, one or higher for how much to multiply the number of snapshots for people when converging people is detected. One would be no change; two would be twice as many. The limit of one per second still applies. |
|---|---|
| OverlapFactor | An integer percentage value, for how much overlap of the target to include in the snapshot. One hundred would use exactly the target ROI. A value of 150 would have 50% higher width and height values than the requested target ROI with the same aspect ratio. |

Inter-Process Semaphore

Figure 12:
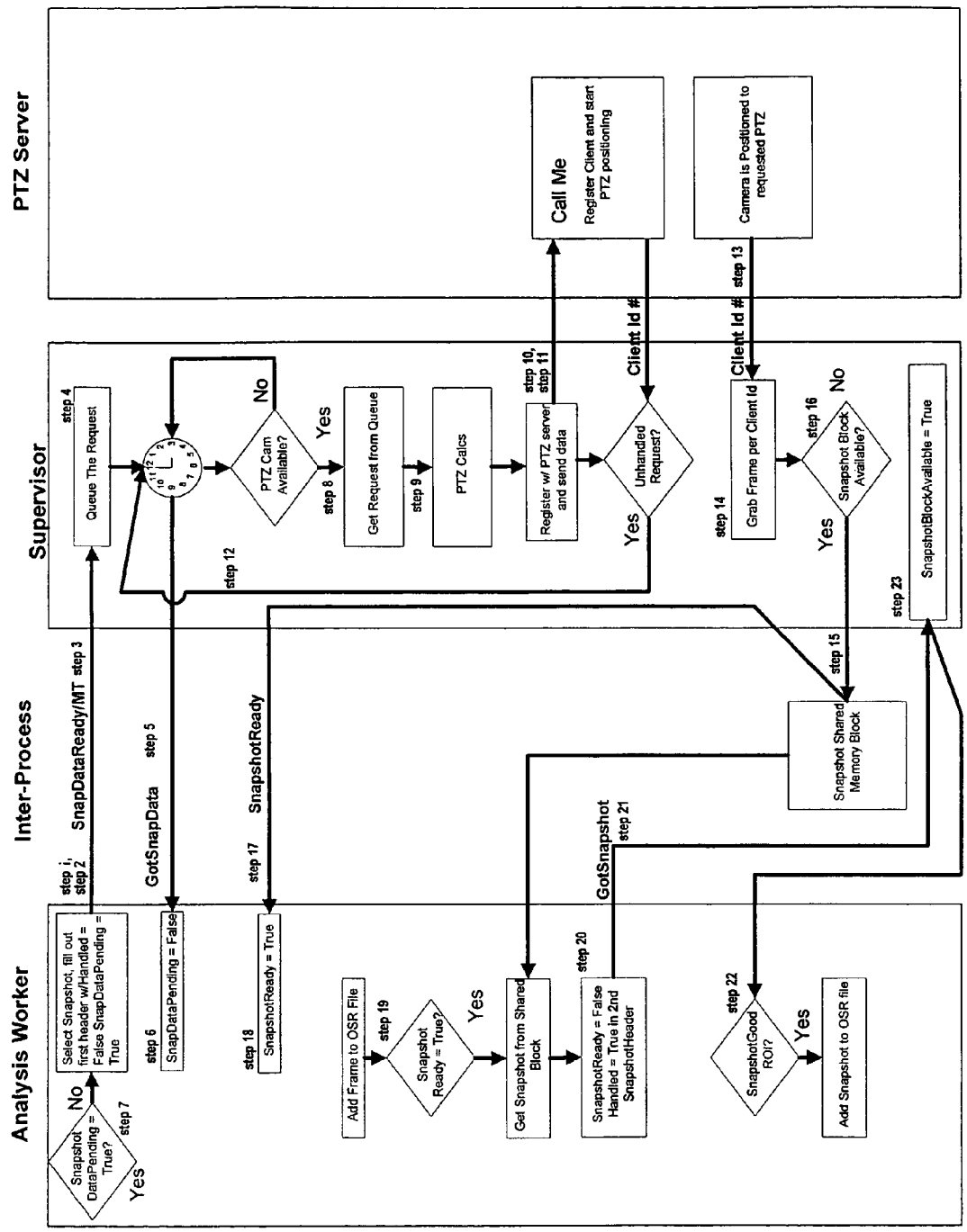
FIG. 12 is an inter-process flow diagram of a so-called semaphore, to show operation thereof in the Directed Attention DVR system of the invention. The semaphore is used for the synchronization of video streaming between Supervisor and AnalysisWorker modules.

Referring to FIG. 12, an inter-process flow diagram of a so-called semaphore, to show operation thereof in the Directed Attention DVR system of the invention, it will be understood that the semaphore is Used for the synchronization of video streaming between Supervisor and Analysis-Worker modules.

Compatibility between the AnalysisWorker and Supervisor will not be broken. The Supervisor uses the existing "Command" method to communicate with the Analysis-Worker. The worker uses the existing "ChildRequest" method to communicate with the Supervisor.

The semaphore defined below allows for an indefinite number of PTZ cameras with differing capabilities. Cameras with more expensive lens could be utilized for long shots and cheaper cameras used for lesser magnification factors.

The semaphore is asynchronous, i.e. snapshots could be made available to the AnalysisWorker out of order from the requests. The data filled out in the request is used to associate the snapshot with the request, not the order of the request. Callbacks from the PTZserver could be out of sequence from the PTZ commands. ClientNumber is used to associate the PTZ callback with a prior request, not the order of the callback.

Snapshot Wanted Semaphore

Example steps of the operation are more specifically explained with respect to FIG. 12:

Step 1. AnalysisWorker selects a ROI for a snapshot.

Step 2. AnalysisWorker fills out the first SnapshotHeaderType of the shared memory block (except for the Snapshot X and Y values) and sets Handled to False.

Step 3. AnalysisWorker sends a ChildRequest of "SnapDataReady" to the Supervisor with a parameter of "MT", and sets a global SnapDataPending to True.

Step 4. On receipt of the SnapDataReady request, the supervisor puts the request in the request queue and starts a SnapshotForkTim timer Step 5. When the SnapDataReady request is handled The supervisor copies the data from the first SnapshotHeaderType to a local SnapShotsPending array, and sends a command "GotSnapData" to the worker.

Step 6. When the "GotSnapData" command is handled by the AnalysisWorker, the SnapDataPending global is set to false.

Step 7. When the next frame is handled, the SnapDataPending global is checked, if false and another snapshot is wanted, then repeat at one above. Snapshot Ready Semaphore Step 8. When the Supervisor SnapshotForkTim fires, the supervisor checks to see if a PTZ camera is available (CameraBusy Boolean=False) that is capable of handling the requested snapshot. If not, then leave the timer enabled to check later. If a PTZ camera is available, go to step 9.

Step 9. Using the input data from the SnapshotHeader and the PTZcameraData array, the supervisor calculates the pan degrees, tilt degrees, and magnification factor for the camera to make the shot.

Step 10. With the PTZ settings known, and the camera known, the Supervisor calls ClientRegistration on the PTZserver and gets back a ClientNumber. That ClientNumber is entered in the PTZcameraData array element for reference when the PTZ server calls back.

Step 11. The Supervisor sets the CameraBusy Boolean to true and makes three calls to PTZcommand in the PTZserver to set the PTZ parameters for the snapshot, and sends a command "CallMe" with the string of the ClientNumber as the ClientName.

Step 12. If there is an un-handled snapshot request in the queue, the SnapshotForkTim is again enabled. Back to step 8 for the next snapshot request.

Step 13. When the PTZ server calls back, the camera is positioned and zoomed for the snapshot defined by the ClientId parameter of the DataFromPriorQuery callback method.

Step 14. The supervisor grabs an image from the camera defined by the ClientId from the PTZcameraData array and stores a pointer to the image in the PTZcameraData and sets the CameraBusy Boolean to False.

Step 15. If the Boolean SnapshotBlockAvail is True, then the supervisor fills out the second SnapshotHeader in the shared memory block, and copies the snapshot into the image area of the shared memory, then sets the global Boolean SnapshotBlockAvail to False.

Step 16. If SnapshotBlockAvail was already False in step 15 above the Supervisor exits the routine and waits for a "GotSnapshot" from the worker as in 21 below.

Step 17. The supervisor sends a command of "SnapshotReady" to the AnalysisWorker.

Step 18. The AnalysisWorker sets the global Boolean SnapshotReady to True when handling the command.

Step 19. When the next frame is written to an OSR file, the SnapshotReady Boolean is checked, if True, the snapshot is added to the OSR file and SnapshotReady is set to False.

Step 20. The AnalysisWorker sets the Handled element of the second SnapshotHeader to True to indicate to the Supervisor that it is Ok to Write to the Shared Memory Block.

Step 21. The AnalysisWorker sends a ChildRequest of "GotSnapshot" to the Supervisor.

Step 22. The AnalysisWorker checks the ROI and SecsSinceMidnight when the snapshot was grabbed. If the target was in that position at that time then the snapshot is saved, else that target can be tried again if it is still in view.

Step 23. If the Supervisor Boolean "SnapshotBlockAvail" was False then the semaphore is entered at step 15.

Calculation of Lead Angle

Because there will be some finite time between receiving the request for a snapshot and the actual grab of the image, the PTZ camera must be pointed to a spot where the target will be when the grab is performed. The following procedure is performed:

1. The time to complete a PTZ operation to the exact location of the ROI in the Request for snapshot is calculated.

2. Position of the target is calculated at the time of completion of the PZT operation referred in the previous step.

3. If the new target position will be within the OVERLAP_FACTOR of the snapshot then the ROI from the request is used, else a new ROI is calculated from the motion parameters and is used for the PTZ calculations.

Calculation of Pan/Tilt/Zoom Parameters

Figure 13:
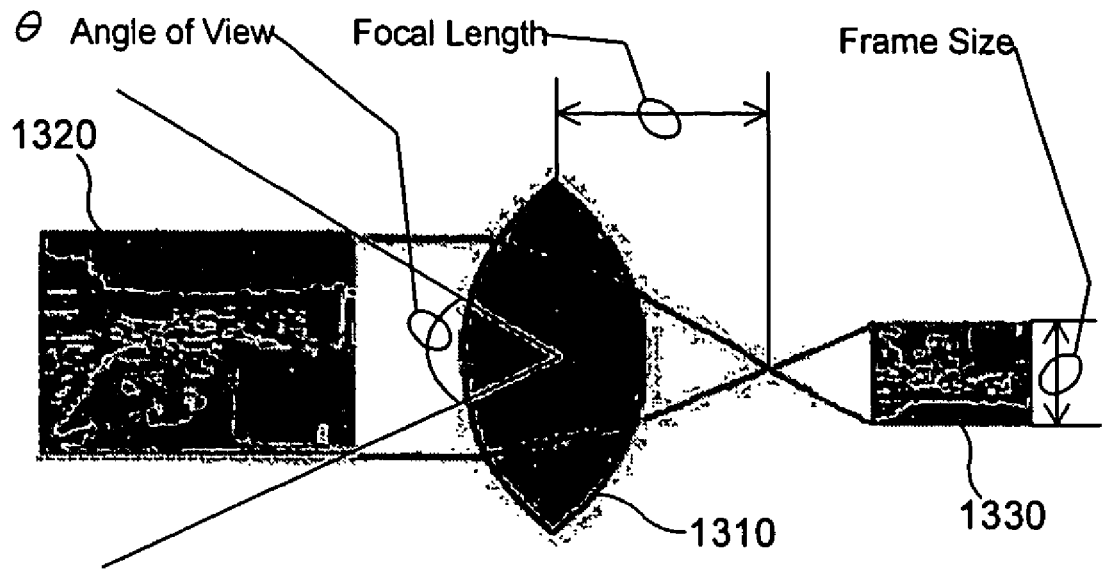
FIG. 13 is an illustration of calculations of pan/tilt angles showing use of a formula for angle of view from many locations.

The calculation of Pan and Tilt angles will be based on the Formula for Angle of View as shown below in FIG. 13. Angle of view θ of objective lens 1310 depends on focal length 'f' and frame size 'F' of frame 1330 representing scene 1320.

The ROI of the target is given in the grabbing resolution that is always known to the Supervisor. The following procedure is performed:

Calculate the Tilt Angle
1. Calculate the CenterY of the ROI RECT.
2. Calculate the percent of image height of the CenterY
3. Subtract 50 from the percent of image height of step 2 (mid-screen is zero tilt angle)
4. Use a vertical frame size that is the percent of image height from step 3.
5. Calculate the angle of view with the adjusted vertical frame size and the focal length from the camera data structure.
6. Make the angle positive if the percent of image height in step two was above 50%, else make negative.
7. The value from step 6 is the tilt angle, where positive values are up and negative values are down.

Calculate the Pan Angle
Same as the tilt angle except use CenterX and horizontal frame size. Positive values are right and negative values left.

Calculate the Magnification Factor
1. Calculate a minimum size RECT of the grabbing aspect ratio that will contain the target ROI.
2. Divide the area of the full grab buffer by the area of the RECT from step 1.
3. Multiply by the PTZ cameras MagnificationCorrection.
4. Limit to the max zoom factor of the PTZ camera.

FIGS. 14 through 17 illustrate that the directed attention concept can be implemented with a single camera or with two or more cameras, with cameras connected by either media or a network, such as the Intranet.

Where two cameras are shown the single PTZ camera is intended to represent one or more PTZ cameras. As indicated in the data structures, a single fixed camera can control multiple PTZ cameras as required to acquire the snapshots. An Object Selective Recording file is defined by a single video stream from a single camera, but the embedded snapshots may come from an indefinite number of PTZ cameras.

FIG. 14-17 show methods of video analysis performed by example Directed Attention DVR systems, with the relevant software execution modules coupled to the corresponding hardware components. Some of the modules, such as the Supervisor, and AnalysisWorker, are included in the existing Perceptrak system (available from Cernium, Inc.) as well.

Figure 14:
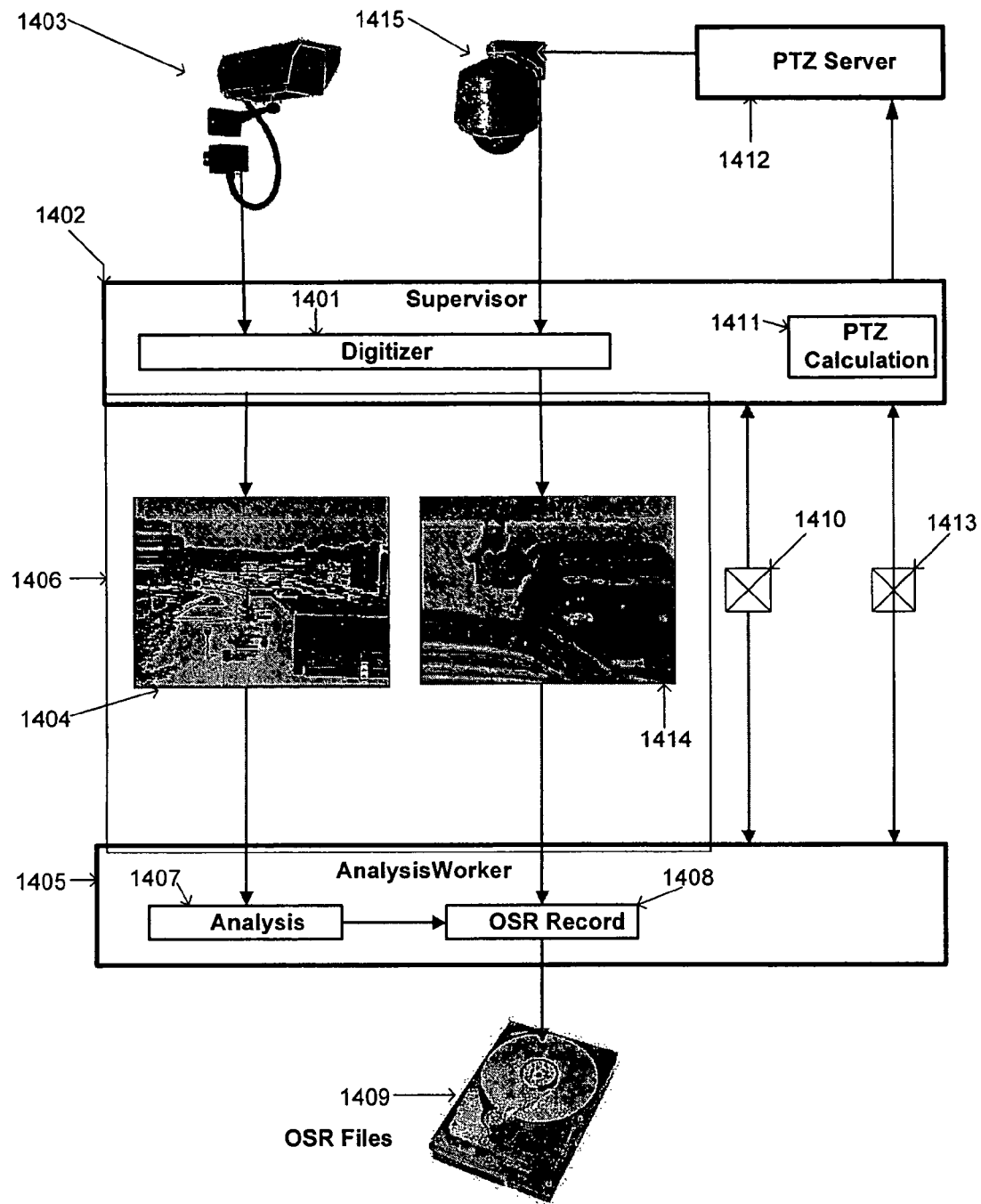
FIG. 14 is a software flow diagram showing semaphore operation with flow of data from an fixed scene-viewing analog camera and a directed-attention PTZ analog camera, relative to a module called AnalysisWorker together with OSR system features for controlling storage of data.

With reference to FIG. 14, a digitizer 1401 resides in the Supervisor 1402 of the type used in the Perceptrak system and grabs the image from the fixed camera 1403. The supervisor sends streaming video 1404 to AnalysisWorker 1405 by using shared memory 1406. The analysis engine 1407 within the AnalysisWorker acquires the image from the shared memory, performs intelligent video analysis and implements Object Selective Recording (OSR) 1408. The OSR file is saved on storage medium 1409.

A semaphore 1410 is used for the synchronization of video streaming between the Supervisor and the AnalysisWorker.

As used herein a "semaphore" indicates a set of rules (or logic construct) controlling inter-process communication in order to coordinate the use of memory shared between the processes. The rules (semaphores) determine the meaning of values (flags) that are set by one process and read by the other. The derivation of the term semaphore is the pre-radio naval practice of inter-ship communication by positioning flags at arms length to indicate letters of the alphabet.

Object tracking, motion and position information from the AnalysisWorker will be sent to the PTZ calculation 1411 and passed to a PTZ server 1412 as activated by the Supervisor.

Another semaphore 1413 is also used for the communication between supervisor and AnalysisWorker to acquire the snapshot 1414 view from PTZ camera 1415.

The PTZ server directs the PTZ camera to zoom to the specified position. This snapshot of detailed object view with time and location of video will be embedded and linked inside the OSR file.

Figure 15:
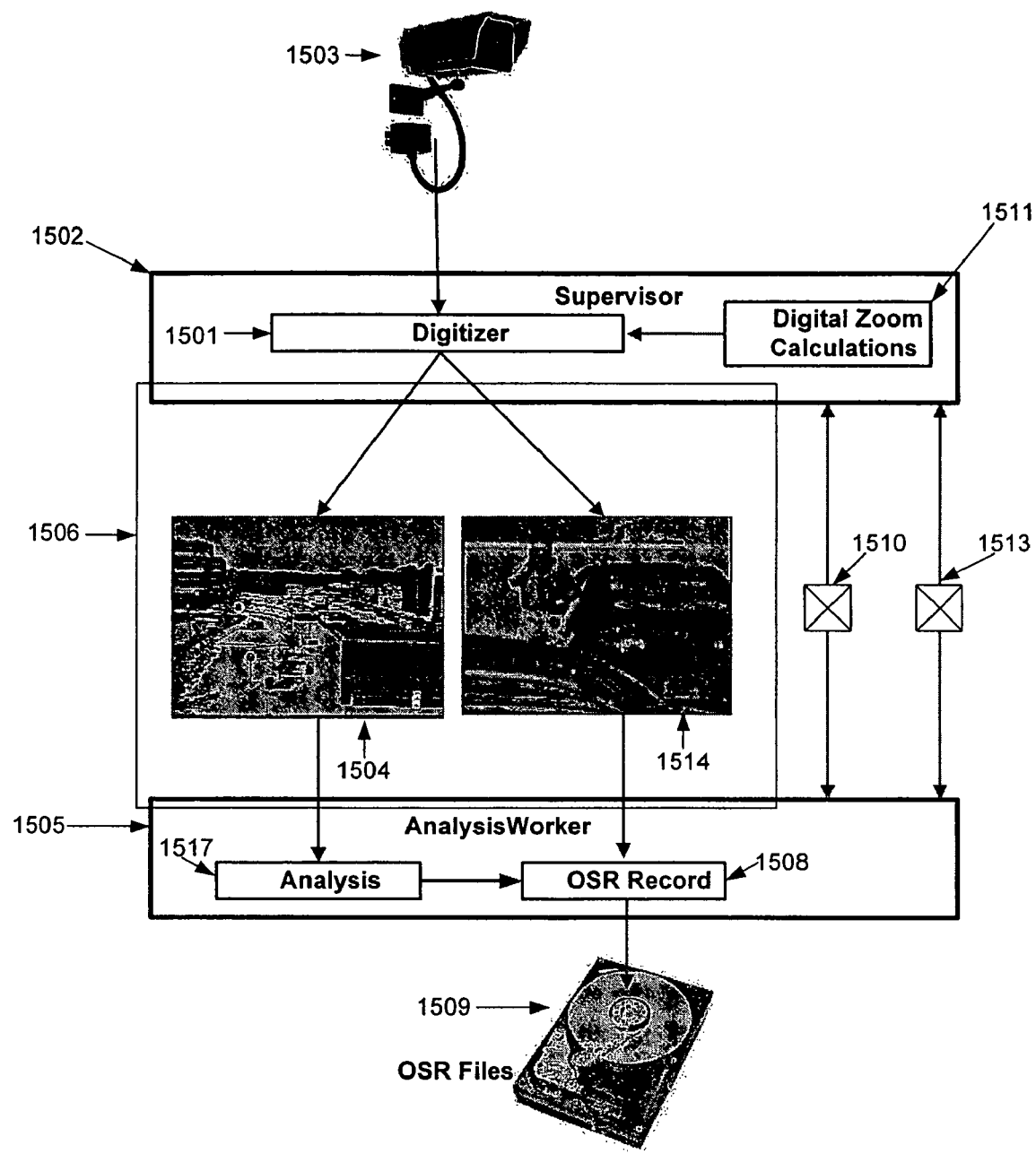
FIG. 15 is a similar software flow diagram showing flow of data from a single high resolution analog camera as used with a digitizer to provide both scene-capturing and directed-attention operation, including data relative to a module called AnalysisWorker and wherein the system includes a Supervisor module and a digitizer which receives digital zoom commands, the system also shown as having OSR system features for controlling storage of data.

With reference to FIG. 15, the Digitizer 1501 which resides in the Supervisor 1502 grabs the high resolution image from the fixed camera 1503. Dependent on the system configuration and requirement, the Supervisor may reduce the video resolution and keep sending such reduced streaming video as 1504 to AnalysisWorker 1505 by using shared memory 1506.

The Analysis Engine 1517 inside the AnalysisWorker acquires the image from the shared memory, performs intelligent video analysis and implements Object Selective Recording (OSR) 8. The OSR file is saved on storage medium 1509.

The semaphore 1510 is used for the synchronization of video streaming between the Supervisor and the AnalysisWorker.

Object tracking, motion and position information from AnalysisWorker will be sent to the PTZ calculation as at 1511. Another semaphore 1513 is also used for the communication between supervisor and AnalysisWorker to acquire the high resolution snapshot 1514 from the specified position of camera view. This snapshot of detailed object view with time and location of video will be embedded and linked inside the OSR file.

Figure 16:
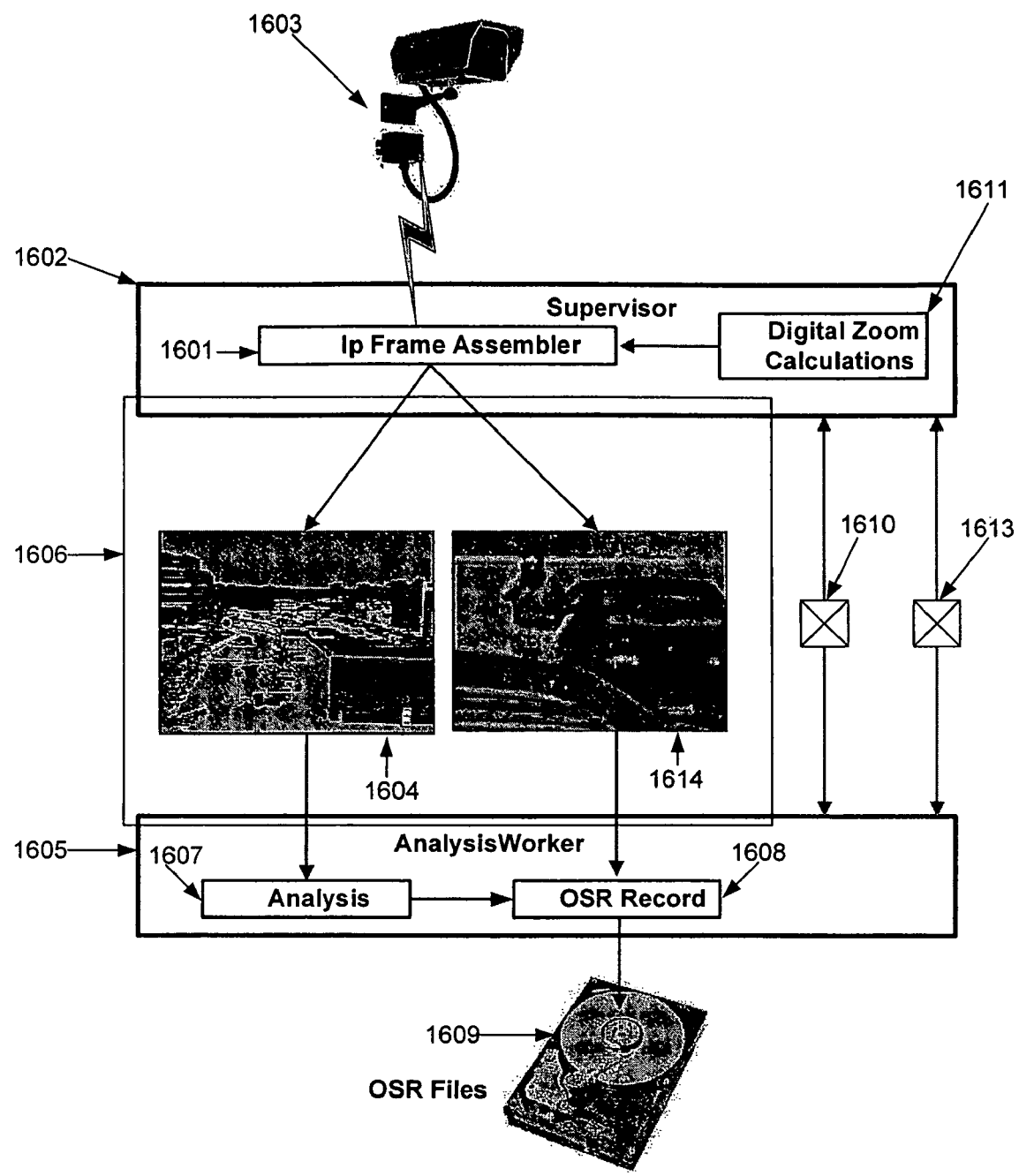
FIG. 16 is a similar software flow diagram showing flow of data from a single high resolution IP (or "IP connected" meaning Internet protocol connected) camera as used with a IP frame assembler and Supervisor to provide both scene-capturing and directed-attention operation, including data relative to a module called AnalysisWorker and wherein the frame assembler receives digital zoom commands, the system also shown as having OSR system features for controlling storage of data.

With reference to FIG. 16, the IP Frame Assembler 1601 which resides in the Supervisor 1602 assembles the streaming video from IP camera with high resolution.

Dependent on the system configuration and requirement, Supervisor may reduce the video resolution and keep sending such reduced streaming video 1604 to AnalysisWorker 1605 by using shared memory 1606.

The Analysis Engine 1607 inside the AnalysisWorker acquires the image from the shared memory, performs intelligent video analysis and implements Object Selective Recording (OSR) 1608. The OSR file is saved on storage medium 1609.

The semaphore 1610 is used for the synchronization of video streaming between the Supervisor and the AnalysisWorker.

Object tracking, motion and position information from AnalysisWorker will be sent to the PTZ calculation 1611. Another semaphore 1613 is also used for the communication between supervisor and AnalysisWorker to acquire the high resolution snapshot 1614 from the specified position of camera view. This snapshot of detailed object view with time and location of video will be embedded and linked inside the OSR file.

Figure 17:
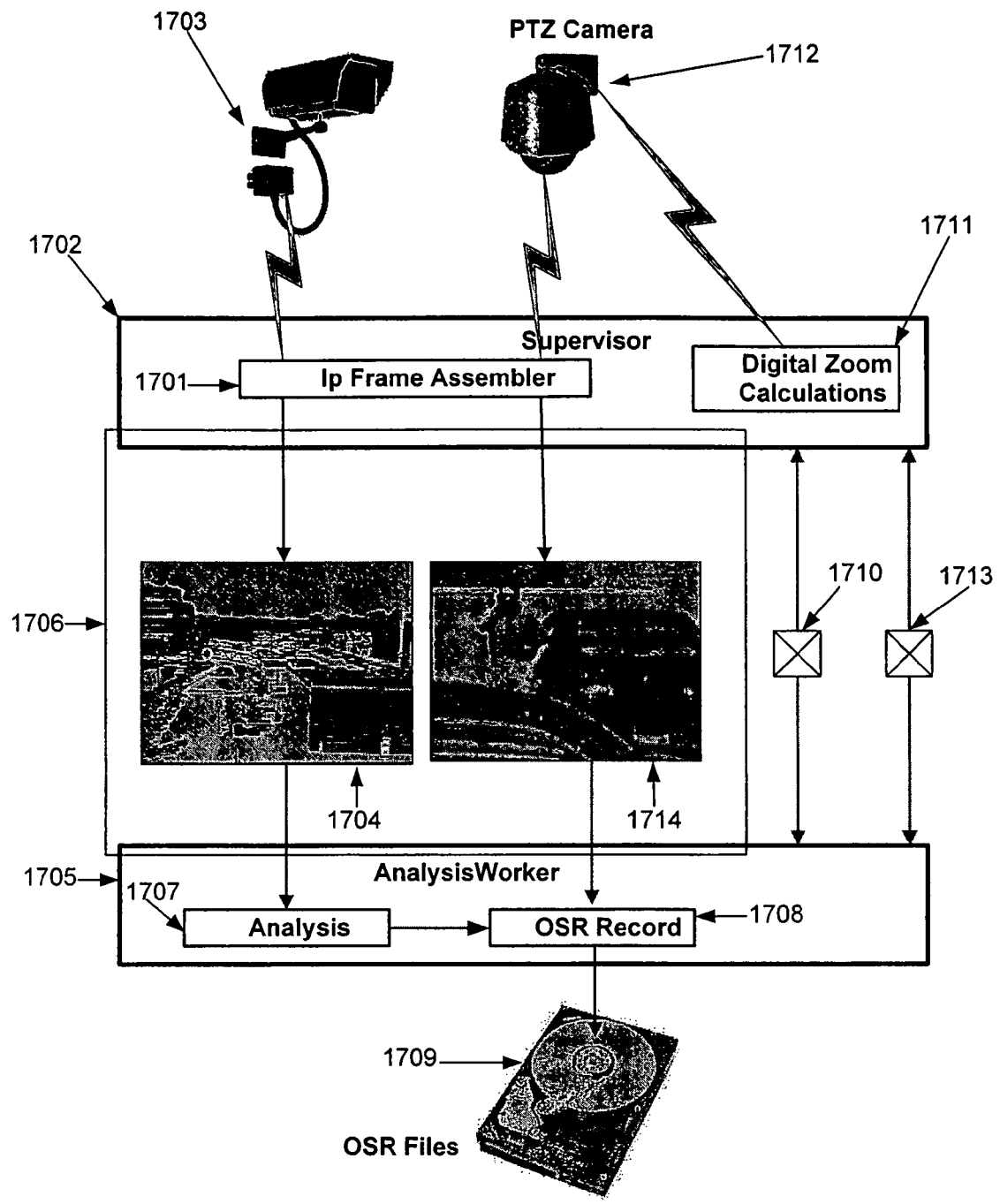
FIG. 17 is a similar software flow diagram showing flow of data from a fixed high resolution IP camera and a PTZ IP camera as used with a IP frame assembler and Supervisor to provide both scene-capturing and directed-attention operation, including data relative to a module called AnalysisWorker and wherein the frame assembler receives digital zoom commands, the system also shown as having OSR system features for controlling storage of data.

With reference to FIG. 17, the IP Frame Assembler 1701 which resides in the Supervisor 1702 assembles the streaming video from an IP camera. The supervisor keeps sending such streaming video 1704 to AnalysisWorker 1705 by using shared memory 1706.

The Analysis Engine 1707 inside the AnalysisWorker acquires the image from the shared memory, performs intelligent video analysis and implements Object Selective Recording (OSR) 8. The OSR file is saved on storage medium 1709.

The semaphore 1710 is used for the synchronization of video streaming between the Supervisor and the Analysis-Worker.

Object tracking, motion and position information from AnalysisWorker will be sent to the PTZ calculation 1711. Supervisor will send out Pant/Tilt/Zoom command to IP camera 1712 via network. Another semaphore 1713 is also used for the communication between supervisor and Analysis-Worker to acquire the snapshot 1714 from the specified position of camera view. This snapshot of detailed object view with time and location of video will be embedded and linked inside the OSR file.

Example Advantages of the Invention

In view of the foregoing, among the several objects, features and advantages of the invention may be noted the provision of system and methodology which:

- automatically tracks targets to provide higher resolution of a target of interest;
- provide efficient recordation by DVR of only those portions of video or other digital image content in such scenes as this as will serve useful forensic purposes;
- aids in identification of subjects which are targets of interest;
- provides storage of only such portions of the scene as will contain a target of interest, and at sufficient pixel resolution as will be useful for such purposes;
- greatly improves resolution of stored images of target of interest;
- greatly reduces digital storage media required for recordation of both scene data and such portions of the scene as will contain a target of interest;
- incorporates detailed snapshots (still images) of targets of interest into a video recording of the overall scene;
- provides for recording of metadata, namely data about the stored data, to link the snapshots to the time and location in the overall scene from which the snapshot was acquired;
- combines use of a first camera to capture scene data with a second "attention directed" higher resolution second camera capable of capturing zoomed or higher resolution capturing of images of a target of interest;
- effectively combines a single fixed high-resolution camera or a fixed standard resolution camera with a Pan-Tilt-Zoom (PTZ) camera;
- facilitates and makes use of selection of a target or target of interest by an intelligent video analysis, such as preferably the object-tracking feature of the Perceptrak system;
- minimizes system equipment complexity and storage facilities;
- simplifies facilities, system requirements and digital storage;
- allows and facilitates convenient and rapid searching of scenes and targets in recorded image data; including search of metadata linked to images;
- operates without human intervention by employing electronically-implemented identification of the existence of any area or target of interest in an image field;
- allows for computer (machine)-implemented security recordation of visual sectors surrounding or within facilities;
- for large-scale implementation so as to permit usage in very large facilities where there may be a myriad of video cameras to be monitored, and where human monitoring of many cameras would not be practical or possible;
- provides for implementation and low cost, with relative ease; and economic and system efficiencies.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented by at least one processing device, comprising:
   recording at a first resolution a first sequence of video images of a scene;
   determining from content of the first sequence of video images a presence of a target of interest within a first portion of the scene at a first time;
   recording at a second resolution, greater than the first resolution, a snapshot image of the first portion of the scene containing the target of interest at the first time;
   recording at the first resolution a second sequence of video images of the scene, the second sequence acquired after the first time but before a second time;
   determining a velocity and a direction of the target of interest from at least one image produced by a single stationary camera;
   predicting, based on the velocity and the direction of the target of interest, that the target of interest will be within a second portion of the scene at the second time different than the first time;
   recording at the second resolution a snapshot image of the second portion of the scene at the second time; and
   linking the snapshot image of the first portion and the snapshot image of the second portion to at least one of the first sequence and second sequence of video images.

2. The method of claim 1, wherein the second time is at least one second after the first time.

3. The method of claim 1, further comprising:
   providing for simultaneous viewing of the first sequence of video images and the snapshot image of the first portion of the scene.

4. The method of claim 1, wherein the determining from the content of the first sequence of video images the presence of the target of interest includes determining that a person is breaking into a car.

5. The method of claim 1, wherein the first portion of the scene containing the target of interest is a first rectangular portion of the scene and the second portion of the scene containing the target of interest is a second rectangular portion of the scene that does not overlap the first rectangular portion of the scene.

6. The method of claim 1, further comprising:
   partitioning the scene into a plurality of portions;
   recording at the second resolution a snapshot image of each portion from the plurality of portions; and
   connecting the snapshot image of each portion from the plurality of portions with the snapshot images of the other portions from the plurality of portions to create a snapshot image of the scene.

7. The method of claim 1, wherein the single stationary camera is a first camera:
   the recording at the first resolution the first sequence of video images includes receiving the first sequence of video images from the first camera; and
   the recording at the second resolution the snapshot image of the first portion of the scene includes receiving the snapshot image of the first portion from a second camera, different from the first camera.

8. The method of claim 1, wherein:
   the recording at the first resolution the first sequence of video images includes receiving the first sequence of video images of the scene from the single stationary camera; and
   the recording at the second resolution the snapshot image of the first portion of the scene includes receiving the snapshot image of the first portion of the scene from the single stationary camera.

9. The method of claim 1, wherein the linking includes linking the snapshot image of the first portion to a time in the at least one of the first sequence and second sequence of video images and a location of the first portion of the scene within the scene.

10. The method of claim 1, wherein the linking includes storing metadata associated with a time in the at least one of the first sequence and second sequence of video images and a location of the first portion of the scene within the scene.

11. The method of claim 1, wherein the first portion of the scene does not overlap the second portion of the scene.

12. The method of claim 1, further comprising:
   storing, in a memory, the first sequence of video images, the content of the first sequence of video images including the target of interest; and
   discarding a third sequence of video images, the content of the third sequence of video images not including the target of interest.

13. A non-transitory processor-readable medium storing code representing instructions to cause a processor to:
   receive a first sequence of video images of a scene having a first resolution;
   determine from content of the first sequence of video images a presence of a target of interest within the scene;
   receive a plurality of snapshot images of the portion of the scene containing the target of interest, a number of the snapshot images of the plurality of snapshot images being of a face of the target of interest, the number being based on a parameter indicating a ratio of the plurality of snapshot images to include the face to those not to include the face, each snapshot image from the plurality of snapshot images having a second resolution greater than the first resolution;
   receive a second sequence of video images of the scene having the first resolution, the second sequence acquired after the first sequence and the plurality of snapshot images; and
   link the plurality of snapshot images to at least one of the first sequence and second sequence of video images.

14. The non-transitory processor-readable medium of claim 13, wherein each snapshot image from the plurality of snapshot images is acquired at a time at least one second after a time at which another snapshot image from the plurality of snapshot images was acquired.

15. The non-transitory processor-readable medium of claim 13, the code further comprising code representing instructions to cause a processor to: provide for simultaneous viewing of the first sequence of video images and the plurality of snapshot images.

16. The non-transitory processor-readable medium of claim 13, wherein the code representing instructions to cause a processor to determine the presence of the target of interest includes code representing instructions to determine that a person is breaking into a car.

17. The non-transitory processor-readable medium of claim 13, wherein the portion of the scene containing the target of interest is a first rectangular portion of the scene, the code further comprising code representing instructions to cause a processor to:
   receive a snapshot image of a second rectangular portion of the scene that does not overlap the first rectangular portion of the scene, the snapshot image of the second rectangular portion having the second resolution.

18. The non-transitory processor-readable medium of claim 13, the code further comprising code representing instructions to cause a processor to:
   partition the scene into a plurality of portions; receive a snapshot image of each portion from the plurality of portions, the snapshot image of each portion from the plurality of portions having the second resolution; and
   connect the snapshot image of each portion from the plurality of portions with the snapshot images of the other portions from the plurality of portions to create a snapshot image of the scene.

19. The non-transitory processor-readable medium of claim 13, wherein the first sequence of video images is received from a first camera and the plurality of snapshot images is received from a second camera different from the first camera.

20. The non-transitory processor-readable medium of claim 13, wherein the first sequence of video images is received from a camera and the plurality of snapshot images is received from the same camera.

21. The non-transitory processor-readable medium of claim 13, wherein the code representing instructions to cause a processor to link the plurality of snapshot images includes code representing instructions to cause a processor to link each snapshot image from the plurality of snapshot images to a time in at least one of the first sequence and second sequence of video images and a location of the portion of the scene within the scene.

22. The non-transitory processor-readable medium of claim 13, wherein the code representing instructions to cause a processor to link the plurality of snapshot images includes code representing instructions to cause a processor to store metadata associated with a time in at least one of the first sequence and second sequence of video images and a location of the portion of the scene within the scene.

23. The non-transitory processor-readable medium of claim 13, wherein the portion of the scene is a first portion of the scene, the scene including a second portion that does not overlap the first portion.

24. The non-transitory processor-readable medium of claim 13, wherein the portion of the scene is a first portion of the scene containing the target of interest at a first time, the code further comprising code representing instructions to cause a processor to:
   receive a velocity and a direction of the target of interest at the first time;
   predict, based on the velocity and the direction of the target of interest, that the target of interest will be within a second portion of the scene at a second time different than the first time; and
   record at the second resolution a snapshot image of the second portion of the scene at the second time.

25. The non-transitory processor-readable medium of claim 13, the code further comprising code representing instructions to cause a processor to:
- store, in a memory, the first sequence of video images, content of the first sequence of video images including the target of interest; and
- discard a third sequence of video images, content of the third sequence of video images not including the target of interest.

26. The non-transitory processor-readable medium of claim 13, wherein the code representing instructions to cause the processor to receive the plurality of snapshot images includes code representing instructions to cause the processor to receive the plurality of snapshot images from a plurality of cameras.

27. The non-transitory processor-readable medium of claim 13, wherein the code representing instructions to cause the processor to receive the first sequence of video images includes code representing instructions to cause the processor to receive the first sequence of video images from a single stationary camera.

28. A method implemented by at least one processing device, comprising:
- recording at a first resolution a sequence of video images of a scene using at least one video camera;
- determining from content of the sequence of video images a presence of a first target of interest within a first portion of the scene;
- recording at a second resolution, greater than the first resolution, a first plurality of snapshot images of the first portion of the scene at a first rate, the first plurality of snapshot images not including a second portion of the scene;
- determining from the content of the sequence of video images the presence of a second target of interest converging with a third target of interest within the second portion of the scene; and
- recording at the second resolution a second plurality of snapshot images of the second portion of the scene at a second rate, the second rate being based on the first rate and a converging multiplier parameter that indicates an amount to increase the first rate when the second target of interest converges with the third target of interest.

29. The method of claim 28, further comprising:
partitioning the scene into a plurality of distinct portions;
- recording at the second resolution a snapshot image of each portion from the plurality of distinct portions; and
- connecting the snapshot image of each portion from the plurality of distinct portions with the snapshot images of the other portions from the plurality of distinct portions to create a snapshot image of the entire scene.

30. The method of claim 28, further comprising:
- linking a position within the scene of each snapshot image from the first plurality of snapshot images and a time within the scene of each snapshot image from the first plurality of snapshot images to the sequence of video images using metadata associated with the position and the time of each snapshot image from the first plurality of snapshot images.

31. The method of claim 28, wherein the first portion of the scene contains the first target of interest at a first time, the method further comprising:
- receiving a velocity and a direction of the first target of interest at the first time;
- predicting, based on the velocity and the direction of the first target of interest, that the first target of interest will be within a third portion of the scene at a second time different than the first time; and
- recording at the second resolution a snapshot image of the third portion of the scene at the second time.

* * * * *

UNITED STATES PATENT AND TRADEMARK OFFICE
CERTIFICATE OF CORRECTION

PATENT NO. : 8,026,945 B2
APPLICATION NO. : 11/491485
DATED : September 27, 2011
INVENTOR(S) : Maurice V. Garoutte et al.

It is certified that error appears in the above-identified patent and that said Letters Patent is hereby corrected as shown below:

Column 23, line 43, change "the" (first occurrence) to --a--.

Signed and Sealed this
Twenty-ninth Day of November, 2011

David J. Kappos
*Director of the United States Patent and Trademark Office*